(12) United States Patent
Lerner

(10) Patent No.: US 7,415,975 B2
(45) Date of Patent: Aug. 26, 2008

(54) OPERATING SYSTEM, KIT AND METHOD FOR ENGINE

(75) Inventor: Moshe Lerner, Ashdod (IL)

(73) Assignee: Greentech Motors (Israel) Ltd., Ashgelon (IL)

( * ) Notice: Subject to any disclaimer, the term of this patent is extended or adjusted under 35 U.S.C. 154(b) by 0 days.

(21) Appl. No.: 11/023,303

(22) Filed: Dec. 27, 2004

(65) Prior Publication Data

US 2005/0279334 A1 Dec. 22, 2005

Related U.S. Application Data

(63) Continuation of application No. PCT/IL03/00549, filed on Jul. 1, 2003.

(51) Int. Cl.
*F02G 5/00* (2006.01)
(52) U.S. Cl. ................................................ 123/557
(58) Field of Classification Search ......... 123/543–557, 123/514
See application file for complete search history.

(56) References Cited

U.S. PATENT DOCUMENTS

| | | | |
|---|---|---|---|
| 2,881,828 A | 4/1959 | McGinnis | |
| 3,738,334 A | 6/1973 | Farr | |
| 3,762,378 A | 10/1973 | Bitonti | |
| 3,767,172 A | 10/1973 | Mills | |
| 4,076,002 A | 2/1978 | Mellqvist et al. | |
| 4,372,278 A | 2/1983 | Smith | |
| 5,711,282 A * | 1/1998 | Lang et al. .................. 123/549 |
| H1820 H | 12/1999 | Graves et al. | |
| 6,332,457 B1 | 12/2001 | Imoehl | |
| 2001/0054608 A1* | 12/2001 | Ohkuma et al. ............. 219/205 |
| 2003/0183209 A1* | 10/2003 | Rigney ........................ 123/557 |

FOREIGN PATENT DOCUMENTS

| | | |
|---|---|---|
| JP | 63 050681 | 3/1988 |
| JP | 09 303227 | 11/1997 |
| WO | WO 00/25015 | 5/2000 |

* cited by examiner

*Primary Examiner*—M. McMahon
(74) *Attorney, Agent, or Firm*—Martin Fleit; Paul D. Bianco; Fleit Gibbons Gutman Bongini & Bianco PL

(57) ABSTRACT

An operating system and method for an engine is provided in which at least some fuel is preheated prior to delivery to the combustion system of the engine. A control system is also provided to operate the engine at higher than normal excess air ratios. The system can be provided in kit form for retrofitting in existing engines.

4 Claims, 20 Drawing Sheets

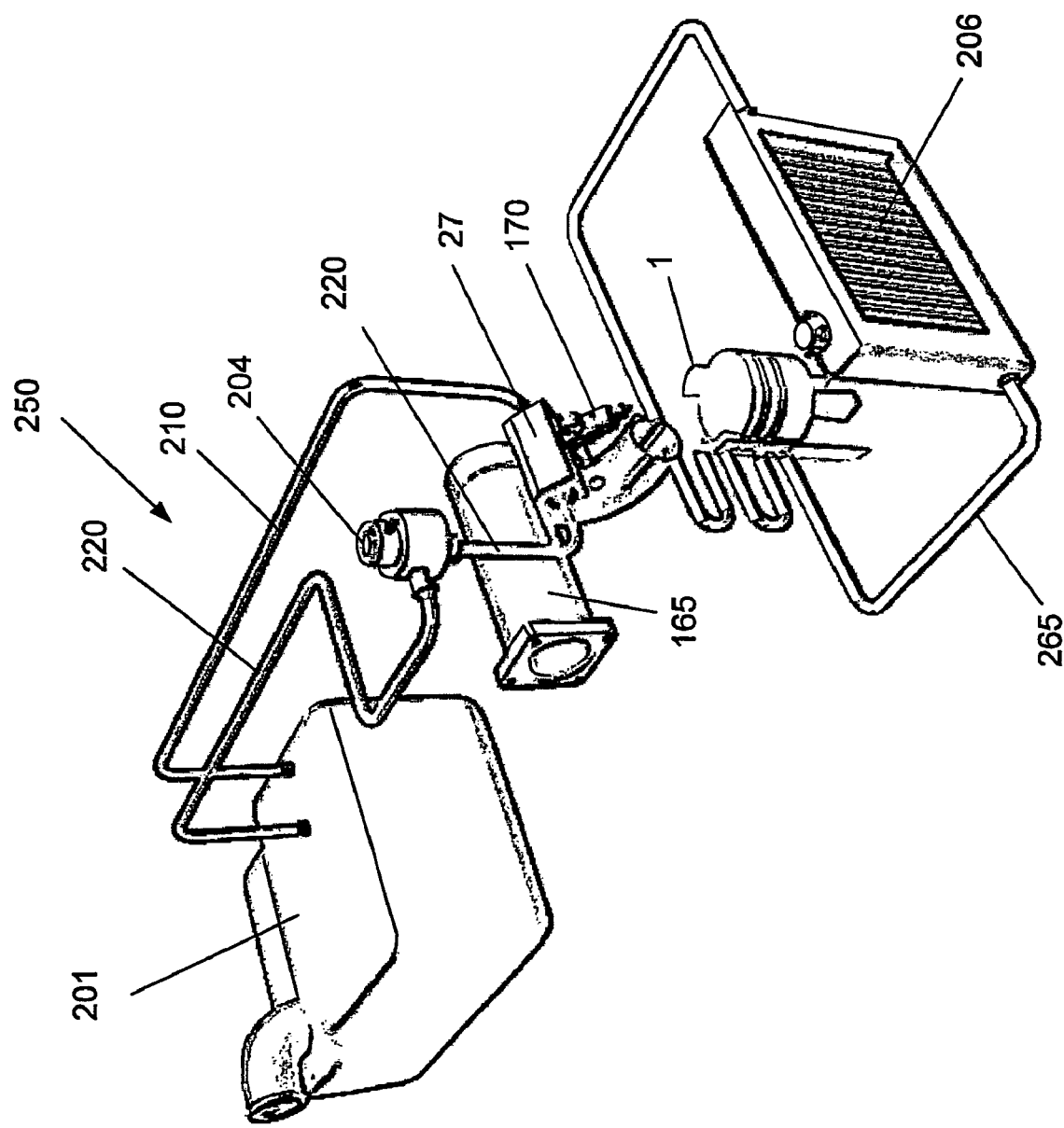

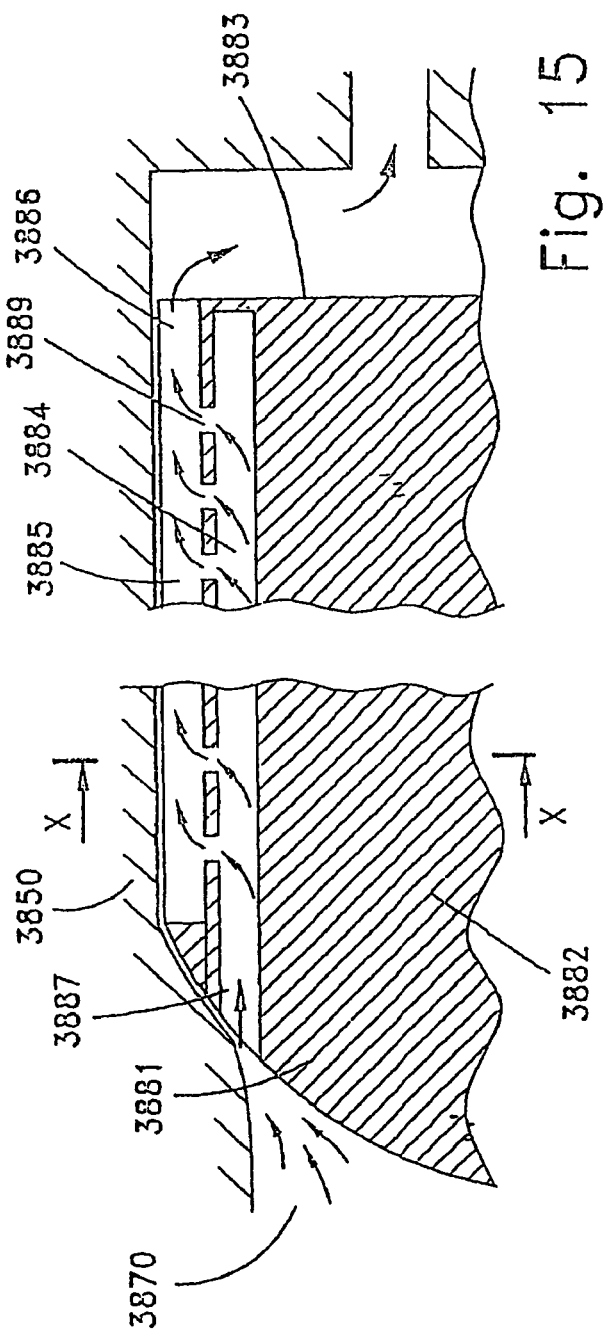
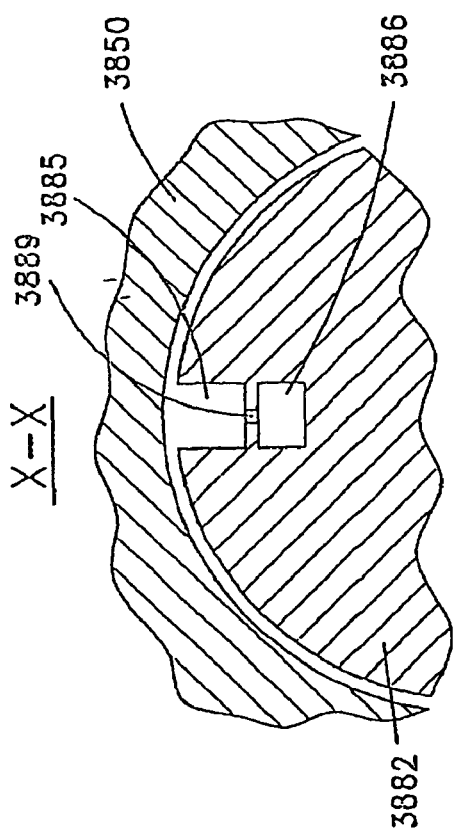

OPERATING SYSTEM, KIT AND METHOD FOR ENGINE

RELATED APPLICATION

This application is a continuation of International Application Serial No. PCT/IL2003/000549 filed Jul. 1, 2003 the contents of which are here incorporated by reference in their entirety; the benefits of 35 U.S.C. Section 120 are claimed.

BACKGROUND OF THE INVENTION

1. Field of the Invention

The present invention relates to fuel system and method for providing fuel to a combustion chamber of an engine for combustion therein, in particular in which the fuel is preheated at moderate pressures to maximize vaporization in the combustion chamber, and in which substantially leaner fuel air mixtures are provided than hitherto, wherein substantial advantages in fuel consumption are achieved. The present invention relates to such a system also comprising means for providing combustion stability for improving engine life.

2. Prior Art

In an internal combustion engine, a fuel/air mixture necessary for the combustion process in the combustion chamber of each cylinder is provided typically by a fuel injection system or a carburetor upstream of or within the inlet manifold, the combustible mixture comprising droplets of fuel of differing sizes entrained in a stream of air. As is well known, at relatively lower temperatures, fuel droplets tend to be of larger diameter and less homogeneously distributed in the air stream than at relatively higher temperatures.

The fuel entry point (typically by way of the carburetor or fuel injector) is generally distanced from the intake port of each combustion chamber by a length of ducting. Typically, the fuel droplets, being distanced away from the hot walls, are kept relatively cool inhibiting full fuel vaporization, and further, the effect of the air stream enhances mutual absorption of droplets into larger droplets. The result is that the fuel/air mixture reaching the combustion chamber comprises a substantially fuel-rich centrally flowing portion comprising a high proportion of fuel droplets that cannot combust rapidly enough when ignited because of their relatively large size, and thus relatively large volume: surface area ratio, and poor availability of oxygen due to non-homogeneous mixing of the air and fuel. The higher the engine rpm, the greater the tendency for the fuel to migrate to the centre of the air stream.

Thus, a proportion of the fuel, typically between 10% and 30% or even higher, is not properly utilized by the engine for generating power, and remains unburnt or is burnt late in the power cycle, being at least partially transformed into pollutants that, to avoid being discharged into the atmosphere, require expensive catalytic converters in the exhaust system for their neutralization. Further, the incomplete combustion of the fuel also results in the formation of carbon deposits, reducing the service life of the ignition units, pistons, valves and the engine in general.

One attempt at increasing the combustion efficiency has focused on pre-heating the fuel prior to injection or to carburetion. Many patents on the subject discuss atomization and/or partial vaporization of fuel. Vaporization systems relate to systems in which the fuel is vaporized, i.e., transformed into the gaseous state of the fuel. In atomization systems, on the other hand, the fuel droplets are broken down into fine liquid particles which are carried along by the airstream, though some amount of vaporization may also occur. However, the presence of liquid droplets or particles, no matter how fine, reduces the efficiency of combustion. Even when stoichiometric air-fuel ratios (i.e., wherein the air factor, $\lambda$ (the ratio of quantity of air used/theoretical air requirement) is unity) are used, there is still an inefficiency in the combustion process. Generally this inefficiency can be explained in terms of the outer layers of each fuel droplet being progressively combusted, and thus the overall combustion process continues as the piston begins to travel in the power stroke. Accordingly, some of the combustion occurs at the lower pressures present during this downstroke, and thus the efficiency of the combustion process is diminished. To obtain optimum performance, all the combustion occurs at about top dead centre (TDC), where pressure is at its highest.

U.S. Pat. No. 4,372,278 describes a fuel system for an engine, in which fuel is said to be vaporized by a combination of high pressure and high temperature of the fuel itself, in contrast to many other types of ostensibly "vaporization systems", which according to this reference are really atomization systems. Such high temperatures and pressures may reach 250° C. and 600 psi, respectively. However, the system described by U.S. Pat. No. 4,372,278 has a number of disadvantages. For example, heating the fuel to elevated temperatures and pressures requires the fuel system to be designed to withstand high temperature fuel circulating around the fuel system. Such a system increases capital costs of the engine, and moreover the high temperature and pressure of the fuel increases risk of damage and injury in case of accidents.

In U.S. Pat. No. 3,762,378 a fuel injection system is described in which fuel is injected directly into the combustion chamber of a cylinder. The fuel is preheated in the injector arrangement prior to injection into the cylinder. The fuel line to the injector includes a heat exchanger arrangement in the exhaust conduit of the cylinder, which also serves to preheat the fuel. The fuel is preheated to a temperature above its ignition temperature, and ignites in the combustion chamber as a result of then being introduced into an environment having a lower pressure than in the injector and oxygen to support combustion. A retractor valve in the fuel conduit to the injector maintains the fuel pressure in the injector above the critical pressure of the fuel but below the opening pressure of the valve head of the injector between pressure pulses.

U.S. Pat. No. 2,881,828 describes a fuel injection system for a diesel engine, in which the fuel temperature is controlled thermostatically by means of heat exchange between the inlet and outlet fuel lines to the injector.

In U.S. Pat. No. 3,738,334, a preheater arrangement heats fuel prior to the carburetor using a heat exchanger arrangement coupled to the exhaust gases.

In addition, prior art fuel heating systems also suffer from the following problem. By heating the fuel droplets to a high temperature, there increases the possibility of premature combustion of the droplets, even before they are fully atomized or vaporized. Pre-ignition problems may develop, and, the fuel is not fully burnt, leading to low running efficiency and an increase in the pollutants emitted to the atmosphere. Such problems are neither discussed nor hinted with respect to such prior art high temperature and pressure fuel heating systems.

In WO 00/25015, a device is provided for improving the atomization and mixing of fuel droplets in the air-fuel mixture upstream of the combustion chamber. Further, a combustion stability means is provided for providing an atomized medium to the combustion chamber during the induction stroke. The medium is described as comprising methanol and acetic acid, which is aerated and siphoned off to the air inlet system of the engine. The methanol improves the vaporization characteristics of the acetic acid. According to this aspect of the invention, an atomizer is provided for ensuring a high degree of atomization of the medium is provided. Such a system may generally help in cleaning parts of the engine and in reducing the possibility of pre-ignition of the fuel-air mixture.

Other devices for enhancing engine performance by providing water in a fine mist state are known, for example as disclosed by U.S. Pat. Nos. 3,767,172 and 4,076,002. However, while improving engine performance, use of water injection in internal combustion engines has certain drawbacks including the formation of calcium and slag deposits on the valves, pistons and spark plugs.

SUMMARY OF INVENTION

It is therefore an aim of the present invention to provide an operating system (and method), particularly a fuel system which substantially overcomes the corresponding limitations of prior art fuel/air systems. In particular, it is an aim of the present invention to provide an operating system comprising a fuel system that operates at relatively low pressure capable of preheating the fuel such as to enables the liquid fuel to be substantially vaporized.

It is another aim of the present invention to provide such an operating system that enables the engine to operate at much higher excess air ratios than in the prior art.

It is another aim of the present invention to provide such a system and method that provides significant improvements in engine efficiency, fuel consumption and performance, and reduction in air pollution.

It is another aim of the present invention to provide such a system that does not substantially diminish the safety of users thereof, particularly in the context of an accident.

It is another aim of the present invention to provide such a system that is retrofitable within existing internal combustion engines, particularly in the form of a kit, and with minimal or nominal modification of the engine or of the surrounding engine bay area.

It is another aim of the present invention to provide such a system that is simple to install and to operate.

It is another aim of the present invention to provide such a device that is relatively simple mechanically and thus economic to produce as well as to maintain.

It is another aim of the present invention to provide such a system that may be connected to the control system of the engine without interfering therewith or causing the control system to believe that there is a malfunction.

In addition, it is another aim of the present invention to provide a suitable combustion stabilization system in conjunction with such a fuel system to provide high levels of fuel efficiency and low levels of pollution to be achieved for an internal combustion engine by way of full combustion of the fuel.

The present invention relates to an operating system for an internal combustion engine, comprising:

a fuel system including heating means for heating at least a portion of fuel to a predetermined temperature prior to delivery of said portion of fuel into the combustion system of the engine, wherein said temperature is below the vaporization temperature of the fuel at the delivery fuel pressure, but not less than the vaporization temperature at the combustion system pressure, i.e. at a temperature sufficient such as to enable said portion of fuel to substantially vaporize at the pressure of the combustion system.

The predetermined temperature may be in the range of between about 60° C. and about 100° C., and preferably between 70° C. and about 85° C.

In a first embodiment, the fuel system comprises:— a primary fuel circuit comprising a fuel tank operatively connected to a pressure valve via an upstream primary conduit and a downstream primary return conduit;

(ii) a secondary fuel circuit comprising fuel injection means in selective communication with the combustion system of the engine, said injection means being operatively connected to said primary conduit via an upstream secondary conduit;

(iii) suitable fuel heating means for heating the fuel in said secondary fuel circuit.

The said injector means may be operatively connected to said return conduit via a downstream secondary return conduit; the primary fuel circuit may comprise suitable pump means for enabling fuel to be circulated therethrough and through said secondary fuel circuit.

The secondary fuel system may be adapted for channeling said portion of the delivery fuel flow provided by the first fuel circuit from the tank. This portion may comprise less than about 10% of the said delivery fuel flow, and preferably from about 2% to about 5% of the said delivery fuel flow. The portion of fuel may be substantially the amount of fuel required to be provided to the engine via the fuel injection means.

Preferably, the secondary fuel circuit comprises a suitable second pressure valve in said secondary return conduit; the heating means may comprise suitable temperature sensing means for sensing fuel temperature therein, said temperature sensing means being operatively connected to a suitable controller, and wherein said controller is operatively connected to said second pressure valve. The controller is preferably adapted for opening said second pressure valve and diverting fuel flow from said heating means when said fuel temperature sensed by said temperature sensing means exceeds a predetermined limit.

In a second embodiment, the fuel system comprises:— a primary fuel circuit comprising a fuel tank operatively connected to a pressure valve via an upstream primary conduit and a downstream primary return conduit;

(ii) a secondary fuel circuit comprising fuel injection means in selective communication with the combustion system of the engine, said injection means being operatively connected to said primary conduit via an upstream secondary conduit;

(iii) suitable fuel heating means for heating the fuel in said primary fuel circuit;

(iv) suitable fuel cooling means for cooling the fuel in said primary return conduit.

In this embodiment, the primary fuel circuit comprises suitable pump means for enabling fuel to be circulated therethrough and through said secondary fuel circuit.

Preferably, the secondary fuel system is adapted for channeling said portion of the delivery fuel flow provided by the first fuel circuit from the tank. The portion may comprise less than about 10% of the said delivery fuel flow, and preferably from about 2% to about 5% of the said delivery fuel flow, and preferably said portion of fuel is substantially the amount of fuel required to be provided to the engine via the fuel injection means.

In a third embodiment, the fuel system comprises:— a primary fuel circuit comprising a fuel tank operatively connected to a fuel injection means via an upstream primary conduit and a downstream primary return conduit, wherein said fuel injection means is in selective communication with the combustion system of the engine;

(ii) suitable fuel heating means for heating the fuel in said primary fuel circuit.

In this embodiment the primary fuel circuit comprises suitable pump means for enabling fuel to be circulated therethrough. Preferably, the fuel circulated by said pump is substantially the amount of fuel required to be provided to the engine via the fuel injection means. Preferably, the primary fuel circuit comprises a suitable second pressure valve in said primary return conduit. The heating means may comprise suitable temperature sensing means for sensing fuel temperature therein, said temperature sensing means being operatively connected to a suitable controller, and wherein said controller is operatively connected to said second pressure valve. The controller is preferably adapted for opening said second pressure valve and diverting fuel flow from said heating means when said fuel temperature sensed by said temperature sensing means exceeds a predetermined limit.

In a fourth embodiment and in a fifth embodiment, the fuel system comprises:— a primary fuel circuit comprising a fuel tank operatively connected to at least one first fuel injection means associated with the combustion system of said engine via an upstream primary conduit and a downstream primary return conduit;

second fuel injection means in selective communication with a preheater means comprising said heating means, said second fuel injection means being operatively connected to said primary conduit via an upstream secondary conduit and adapted for providing said portion of fuel to said preheater means;

air bleed from an engine air intake system in communication with said preheater means for providing a predetermined air flow to said preheater means, said preheater means adapted for mixing said air and said portion of fuel therein;

said preheater means further comprising a secondary downstream conduit in communication with said combustion system for providing a air fuel mixture thereto heated to said predetermined temperature via said preheater means.

The primary fuel system is adapted for channeling said portion of the delivery fuel flow via said second upstream fuel conduit, and said portion typically comprises less than about 10% of the said delivery fuel flow, and preferably from about 2% to about 5% of the said delivery fuel flow. The said portion of fuel is typically substantially less than the amount of fuel required to be provided to the engine via the fuel injection means.

The preheater means comprises a housing having a chamber in communication with said second fuel injection means and said air bleed.

In the fourth embodiment, the chamber comprises a core portion having a plurality of passages therethrough adapted for mixing of the air and fuel provided to the said chamber and for heating the fuel to said predetermined temperature.

In the fifth embodiment, said chamber comprises a pair of counter-rotatable rotors mounted for rotation therein, a nozzle means for directing the fuel provided by said second fuel injection means and air provided by said air bleed towards said rotors such as to impinge thereon, and screen means adapted for allowing only vaporized fuel and air to pass therethrough, and further comprising a downstream core portion having a plurality of passages therethrough adapted for further heat transfer from the preheater to said fuel to maintain said portion of fuel at said predetermined temperature. The nozzle means is adapted for directing said fuel provided by said second fuel injection means and said air provided by said air bleed to an area between said rotors such as to cause said rotors to counter rotate. Each said rotor comprises a plurality of vanes, each said vanes comprising a pair of walls connected to a rotor hub at the root of the vane, and joined together at the tip of the vane. The walls are spaced from one another, and made from a flexible material such that said walls are urged together when the rotors are rotated at a predetermined high speed. The walls are preferably made from a mesh-type material, and the mesh pattern of said walls is such that when said walls are urged together, at least some of the open spaces of the mesh of one wall are not superposed over the open spaces of the mesh of the other wall.

The screen means of the fifth embodiment typically comprises a first mesh member and a secondary mesh member superposed with respect thereto, wherein at least one of said first mesh member and said second mesh member is rotatable with respect to said second mesh member or said first member, respectively, wherein at least some of the open spaces of said first mesh member are not superposed over the open spaces of the second mesh member. Preferably, said first mesh member and a secondary mesh member comprise mesh geometries such that when first mesh member and a secondary mesh member are rotated with respect to one another the effective open area between them is increased or decreased. The screen arrangement preferably further comprises a suitable mechanism for automatically and selectively rotating said first mesh member with respect to said secondary mesh member such as to increase or decrease said effective open area.

The fourth and fifth embodiments preferably further comprise suitable control means for operating the said secondary fuel injection means as desired.

In all embodiments, the heating means preferably comprises a suitable heat exchanger arrangement whereby heat generated in the cooling system of the engine is provided to the fuel being heated. The heat exchanger arrangement may comprise a heat exchange conduit operatively connected to the cooling system of the engine, said heat exchange conduit passing through said injector means such as to enable the fuel flowing through said injector means to be heated. Optionally, the heat exchange conduit is suitably ribbed to enhance heat exchange with said fuel. The heating means may alternatively or further comprise a suitable auxiliary heating means for heating said fuel independently of the temperature of the engine. Optionally, said auxiliary heating system comprises an electrical heater.

In all embodiments, the fuel injection means may comprise a plurality of fuel injectors, each injector being associated with a cylinder of the engine and comprising a fuel injection end in selective communication with the combustion system of the engine. The plurality of fuel injectors may be in mutual fluid communication via a common conduit.

In all embodiments, the injection means may provide fuel directly to a combustion chamber of the engine. Alternatively, the injection means provide fuel to the air intake system upstream of a combustion chamber of the engine.

Preferably, the operating system further comprises:—

(b) suitable control means for providing to said engine an air fuel ratio corresponding to a target excess air ratio substantially greater than a datum excess air ratio, wherein said datum excess air ratio is associated with at least one optimal running characteristic of a said engine, wherein such an engine is operated without the said operating system, i.e., when the engine is operated with a regular fuel system in place of the fuel system including fuel heating means in (a).

The datum excess air ratio is typically between 0.96 and 1.04, and the said target excess air ratio is substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.3.

Preferably, the target air excess ratio is such as to provide at least one optimal running characteristic for said engine, including at least one of optimum fuel consumption and optimum torque for the engine. The datum excess air factor typically corresponds to a fuel-air ratio of about 14.7 to 1 by mass.

In all embodiments, the target excess air ratio at any engine condition may be provided by delivering a lower fuel flow to said combustion system in relation to the corresponding fuel flow delivered in said corresponding engine in (b) when run at substantially the same engine condition. In such a case, the said control means may be operatively connected to said fuel injection means of the engine.

Alternatively or additionally, the target excess air ratio at any engine condition may be provided by delivering a higher air flow to said combustion system in relation to the corresponding air flow delivered in said corresponding engine in (b) when run at substantially the same engine condition. The higher air flow may be delivered by means of a turbocharger comprised in the air inlet system of the engine, and the said control means is operatively connected to said air intake means.

The said control means may comprise a suitable computer or electronic means. Optionally, the said control means is comprised in the fuel injection control computer of the engine.

Particularly for the fourth and fifth embodiments, said control means are preferably separate from the control system of said engine, and said control means are adapted for controlling the operation of said secondary fuel injection means and for providing the appropriate signals to said control system of the engine such as to operate said primary fuel injection means at said target excess air ratios. Advantageously, the control means is operatively connected to at least one engine sensor that is used for determining the air intake of said engine, and wherein said control means provides suitable signals to said control system mimicking the signals that would normally be provided thereto by said at least one sensor, said mimicked signals being such as to enable the said control system to operate said primary injection means to provide the required fuel flow corresponding to said target excess air ratios, corrected for the fuel provided via said secondary fuel injection means.

The present invention also relates to an additive atomizing unit for use in conjunction with an engine operating system as defined herein, for delivering an atomised medium to a combustion chamber comprised in said engine, said additive atomizing unit comprising:— a refillable reservoir for holding a volume of said medium;
an atomizing unit;
suitable first and second fluid lines for respectively providing fluid communication between said reservoir and said atomizing unit, and between said atomizing unit and said intake system of said engine.

The additive atomizing unit may further comprise a suitable filter in said first fluid line.

The atomizing unit may comprise a housing having air inlet means at a bottom side thereof, an aerator for aerating said medium, an upper collection volume for collecting aerated vaporized medium, and outlet means in fluid communication with said engine intake system via said second fluid line. Air may be provided to said air inlet means via a suitable air pipe in communication with a suitable air filter. The additive atomizing unit may further comprise automatic filler means operatively connected to a suitable level detector for maintaining the level of medium in said atomizing unit. The medium typically comprises a mixture of methanol and acetic acid; the mixture typically comprises about 60% to 80%% methanol and about 40% to 20% acetic acid by volume. The additive atomizing unit preferably further comprises a distribution collar installed in the air intake system of the engine for providing fluid communication between said atomizing unit and said intake system of said engine.

The present invention also relates to a method for operating an internal combustion engine, comprising:

heating at least a portion of fuel to a predetermined temperature prior to delivery of said portion of fuel into the combustion system of the engine, wherein said temperature is below the vaporization temperature of the fuel at the delivery fuel pressure, but not less than the vaporization temperature at the pressure of the combustion system, i.e., a temperature that is sufficient such as to enable said portion of fuel to substantially vaporize at the pressure within the combustion system in which the portion of fuel is delivered.

The predetermined temperature is typically in the range of between about 60° C. and about 100° C., and preferably between 70° C. and about 85° C. The at least portion of fuel may be heated by means of a fuel system as defined herein.

The method preferably further comprises:—

(B) controlling an air fuel ratio to said engine such as to provide an excess air ratio substantially greater than a datum excess air ratio, wherein said datum excess air ratio is associated with at least one optimal running characteristic of a corresponding engine, wherein step (A) is not applied to said corresponding engine.

The said datum excess air ratio is typically between 0.96 and 1.04; the said target excess air ratio is substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.3.

Preferably, said target air excess ratio is such as to provide at least one optimal running characteristic for said engine, which may include at least one of optimum fuel consumption and optimum torque for the engine. The datum excess air factor typically corresponds to a fuel-air ratio of about 14.7 to 1 by mass.

The target excess air ratio at any engine condition may be provided by delivering a lower fuel flow to said combustion system in relation to the corresponding fuel flow delivered in said corresponding engine in (B) when run at substantially the same engine condition. The said excess air ratio may be controlled by suitable control means operatively connected to a fuel injection means of the engine.

Alternatively or additionally, the target excess air ratio at any engine condition may be provided by delivering a higher air flow to said combustion system in relation to the corresponding air flow delivered in said corresponding engine in (B) when run at substantially the same engine condition. The higher air flow may be delivered by means of a turbocharger comprised in the air inlet system of the engine, and control of said excess air ratio is performed by suitable control means, including a suitable computer means and/or electronic control means, which may be comprised, for example, in the fuel injection control computer of the engine.

The present invention also relates to a kit for retrofitting an internal combustion engine with an operating system, comprising heating means for heating at least a portion of fuel to a predetermined temperature prior to delivery of said portion of fuel into the combustion system of the engine, wherein said temperature is below the vaporization temperature of the fuel at the delivery fuel pressure, but not less than the vaporization temperature of the fuel at the pressure of the combustion system, i.e., a temperature that is sufficient such as to enable said portion of fuel to substantially vaporize at the pressure within the combustion system in which the portion of fuel is delivered. The predetermined temperature is typically in the range of between about 60° C. and about 100° C., and preferably between 70° C. and about 85° C.

The kit may comprise the system according to any one of the first, second, third, fourth or fifth embodiments of the invention, adapted for retrofitting with respect to an existing engine. For example, a kit derived from the system of the first embodiment is typically for use with engine that comprises:— a primary fuel circuit comprising a fuel tank operatively connected to a pressure valve via an upstream primary conduit and a downstream primary return conduit, said primary fuel circuit comprising fuel injection means upstream of said pressure valve, said fuel injection means being in selective communication with the combustion system of the engine;

and said kit comprises:— first conduit means for re-routing the said primary conduit directly from tank to said pressure valve rather than from said tank to said fuel injection means;

(ii) second conduit means for operatively connecting said fuel injection means to said first conduit means;

(iii) third conduit means for operatively connecting the downstream end of said fuel injection means to said primary return conduit rather than to said pressure valve (iv) suitable fuel heating means for heating the fuel in said fuel injection means.

The said first conduit means and said second conduit means are typically adapted for channeling said portion of the delivery fuel flow provided by the primary fuel conduit from the tank. The said portion may comprise more about 10% of the said delivery fuel flow, and preferably from about 2% to about 5% of the said delivery fuel flow, and preferably said portion of fuel is substantially the amount of fuel required to be provided to the engine via the fuel injection means.

The said third conduit means circuit preferably comprises a suitable second pressure valve in said secondary return conduit.

The heating means of the kit preferably comprises suitable temperature sensing means for sensing fuel temperature therein, said temperature sensing means being operatively connected to a suitable controller, and wherein said controller is operatively connected to said second pressure valve. The controller is adapted for opening said second pressure valve and diverting fuel flow from said heating means when said fuel temperature sensed by said temperature sensing means exceeds a predetermined limit.

The kit preferably further comprises:— suitable control means for providing to said engine an air fuel ratio corresponding to a target excess air ratio substantially greater than a datum excess air ratio, wherein said datum excess air ratio is associated with at least one optimal running characteristic of the engine in the absence of said kit.

The target excess air ratio is substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.3, and preferably said target air excess ratio is such as to provide at least one optimal running characteristic for said engine, which may include at least one of optimum fuel consumption and optimum torque for the engine.

The kit may be adapted such that the target excess air ratio at any engine condition is provided by delivering a lower fuel flow to said combustion system in relation to the corresponding fuel flow delivered in said corresponding engine in the absence of said kit and when run at substantially the same engine condition, and the said control means may be operatively connected to said fuel injection means of the engine.

Alternatively or additionally, the target excess air ratio at any engine condition may be provided by delivering a higher air flow to said combustion system in relation to the corresponding air flow delivered in said corresponding engine in the absence of said kit and when run at substantially the same engine condition. The higher air flow may be delivered by means of a turbocharger comprised in the air inlet system of the engine; the control means may be operatively connected to said air intake means and may comprise a suitable computer means, which may be comprised in the fuel injection control computer of the engine.

In another example, a kit derived from the system of the fourth or fifth embodiments is typically for use with engine that comprises:— a primary fuel circuit comprising a fuel tank operatively connected to a plurality of primary fuel injection means via an upstream primary conduit and a downstream primary return conduit and comprising suitable means for providing a required operating fuel delivery pressure, said primary fuel circuit comprising first fuel injection means upstream of said pressure valve, said primary fuel injection means being associated with the combustion system of the engine; said engine further comprising an air intake system for providing air to said combustion system, and a control system for operating said primary fuel injection means;

and wherein said kit comprises:— bypass conduit operatively connecting said primary fuel conduit with said primary return conduit, and comprising a pressure valve and tap for reducing the operating fuel delivery pressure relative to said engine when operated without said kit;

preheater means comprising said heating means, and further comprising a second fuel injection means operatively connected to said primary fuel conduit via an upstream secondary conduit and adapted for providing said portion of fuel to said preheater means;

air bleed conduit providing communication between said engine air intake system and said preheater means for providing a predetermined air flow to said preheater means, said preheater means adapted for mixing said air and said portion of fuel therein;

said preheater means further comprising a secondary downstream conduit in communication with said combustion system for providing a air fuel mixture thereto heated to said predetermined temperature via said preheater means.

In this kit, said second fuel conduit is adapted for channeling said portion of the delivery fuel flow to said preheater, said portion may comprise less than about 10% of the said delivery fuel flow, and preferably from about 2% to about 5% of the said delivery fuel flow, and said portion of fuel is typically substantially less than the amount of fuel required to be provided to the engine via the fuel injection means. The preheater is substantially similar to that described for the fourth or fifth embodiments.

This kit also comprises suitable control means for providing to said engine an air fuel ratio corresponding to a target excess air ratio substantially greater than a datum excess air ratio, wherein said datum excess air ratio is associated with at least one optimal running characteristic of the engine when operated without said kit. This control means is substantially similar to that described for the operating system of the fourth or fifth embodiments, and are adapted for controlling the operation of said secondary fuel injection means and for providing the appropriate signals to said control system of the engine such as to operate said primary fuel injection means at said target excess air ratios. Thus typically, the control means is operatively connected to at least one engine sensor that is used for determining the air intake of said engine, and wherein said control means provides suitable signals to said control system mimicking the signals that would normally be provided thereto by said at least one sensor, said mimicked signals being such as to enable the said control system to operate said primary injection means to provide the required fuel flow corresponding to said target excess air ratios, corrected for the fuel provided via said secondary fuel injection means. The control means is also operatively connected to said air intake means. The control means typically comprises a suitable computer means or a suitable electronic control means.

The present invention also relates to a method for retrofitting an internal combustion engine with an operating system similar to the first embodiment, typically in kit form, wherein said engine comprises:— a primary fuel circuit comprising a fuel tank operatively connected to a pressure valve via an upstream primary conduit and a downstream primary return conduit, said primary fuel circuit comprising fuel injection means upstream of said pressure valve, said fuel injection means being in selective communication with the combustion system of the engine;

and wherein said method further comprises:— re-routing the said primary conduit directly from tank to said pressure valve rather than from said tank to said fuel injection means;

(ii) operatively connecting said fuel injection means to said re-routed primary conduit;

operatively connecting the downstream end of said fuel injection means to said primary return conduit rather than to said pressure valve providing suitable fuel heating means for heating the fuel in said fuel injection means.

The present invention also relates to a method for retrofitting an internal combustion engine with an engine operating system, comprising providing said engine with a kit according to the fourth or fifth embodiments of the system, and further comprising:— bypassing said primary fuel conduit and said primary return conduit for reducing the operating fuel delivery pressure relative to said engine when operated without said kit;

operatively connecting the primary fuel conduit to the preheater means;

bleeding air from the engine air intake system to the preheater means;

routing the outlet end of the preheater means to the combustion system of the engine.

BRIEF DESCRIPTION OF THE DRAWINGS

FIG. 2 illustrates the general layout of the main elements of the fuel system of an internal combustion engine of the prior art.

FIG. 15 illustrates in cross-sectional view a portion of the preheater of FIGS. 12 to 14.

FIG. 16 illustrates in cross-sectional view, the preheater of FIG. 15 taken along X-X.

DETAILED DESCRIPTION OF PREFERRED EMBODIMENTS OF THE INVENTION

The present invention is defined by the claims, the contents of which are to be read as included within the disclosure of the specification, and will now be described by way of example with reference to the accompanying Figures.

The relative positional terms "upstream" and "downstream" herein refer to directions generally away from and along the direction of flow, respectively, of a fluid including air, fuel and mixtures thereof, unless otherwise specified.

The term vaporization temperature refers to the temperature at which fuel substantially vaporizes at a given pressure. Thus, the vaporization temperature of fuel at a high temperature such as at the fuel system pressure is higher than the vaporization temperature at ambient atmospheric or sub-ambient pressures, as typically exist in the upstream combustion system of an engine.

The present invention relates to an operating system for an internal combustion engine, comprising a fuel system adapted for supplying preheated fuel to an internal combustion engine at moderate pressures such as to enable the fuel to substantially fully vaporize in the combustion chamber, prior to combustion thereof. In particular, the operating system also comprises means for controlling the fuel-air ratio, so that substantially leaner fuel-air mixtures than suggested by the prior art are provided to the engine, resulting in improvements in performance including fuel consumption. The present invention also relates to an improved combustion stability system for delivering a vaporized medium to a combustion chamber comprised in said engine, thereby providing additional benefits to the heated fuel system.

The following description, though directed at internal combustion engines operating on the Otto cycle, is also applicable to other internal combustion engines, including Diesel engines, mutatis mutandis. Similarly, while the following description is directed at a cylinder of a reciprocating piston engine, it is also applicable to any other type of internal combustion engine, including for example, the Wankel engine.

Figure 1:
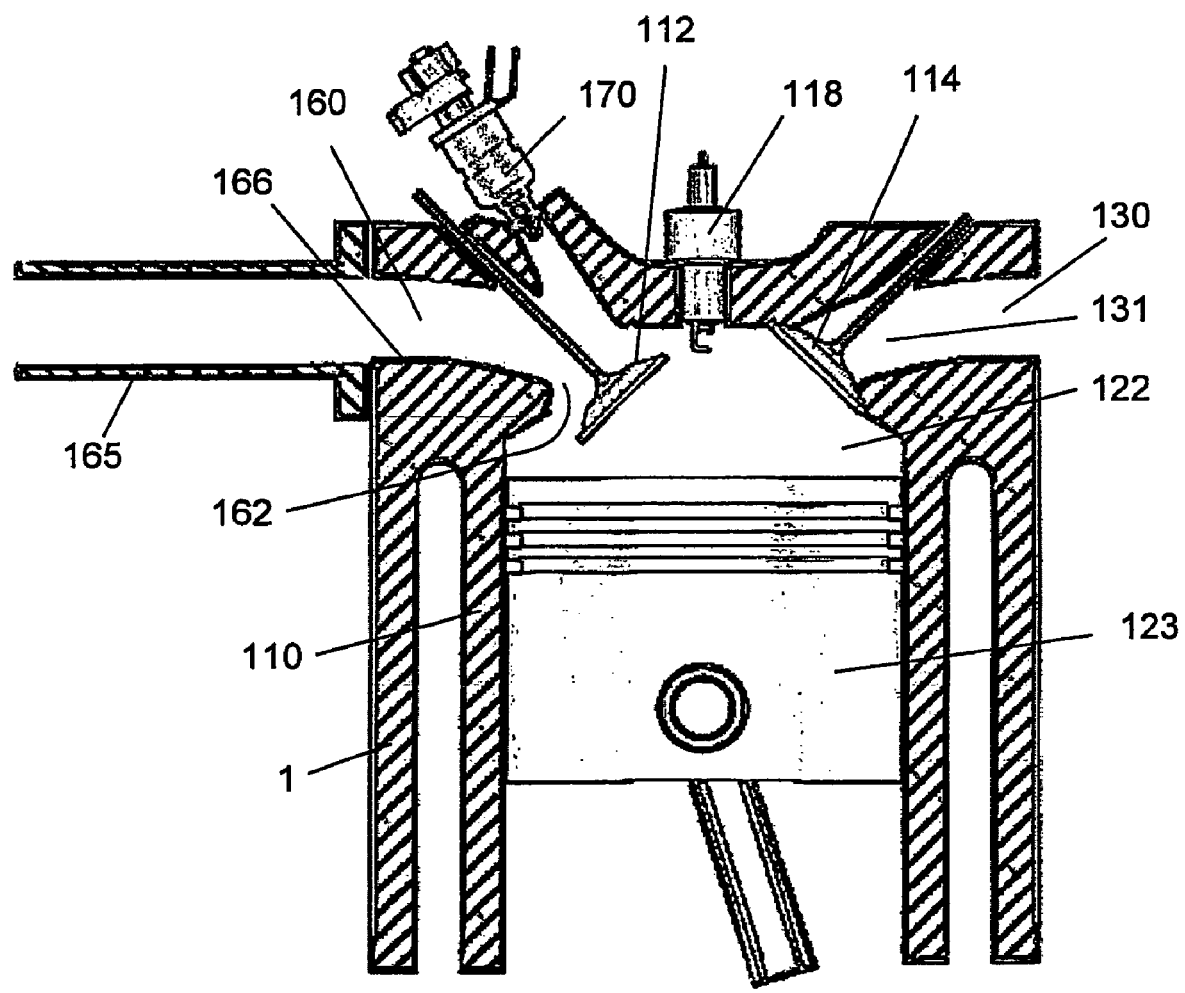
FIG. 1 illustrates the general layout of the air inlet and combustion system of an internal combustion engine of the prior art.

Referring to FIG. 1, a typical conventional internal combustion spark-ignition engine (1) comprises at least one cylinder (110) having an internal reciprocating piston (123) operatively connected to a crankshaft (not shown), and an upper combustion chamber (122).

Said cylinder (110) further comprises means for introducing air and fuel separately. The air inlet system of the engine (1) typically comprises an air inlet duct (160) and an intake manifold (165). The air inlet duct (160) is in fluid communication with an inlet port (162), having an inlet valve (112), and with an air supply, typically provided directly from the atmosphere via intake manifold (165), or via a turbocharging or supercharging system (not shown). The air inlet duct (160) is typically comprised in the cylinder head of an engine (1) which is mounted onto the engine block thereof. Liquid fuel is provided by a fuel inlet pipe or injector (170) in fluid communication with the air inlet duct (160). Typically there is a separate fuel injector (170) for each cylinder (110) of the engine (1), located in the intake manifold (165), or having its injector nozzle in the combustion chamber (122) itself. (Alternatively, said cylinder (110) comprises means for introducing air and fuel which has been already premixed to some degree in a carburetor (not shown), for example, said means being in fluid communication with said air inlet duct (160) via said intake manifold (165).) Typically, the manifold (165) comprises an upstream end and is branched downstream into a number of branches correlated to the number of said cylinders (110) in the engine (1). Other arrangements are well known in the art. Said cylinder (110) further comprises means for exhausting the fluid contents of the cylinder after the power stroke, comprising an outlet duct (130) in fluid communication with an outlet port (131) in the combustion chamber (122) having an outlet valve (114). The said cylinder (110) further comprises ignitor means (118) such as a spark plug or the like.

Most conventional internal combustion spark-ignition engines operate on a four-stroke cycle, though some engines work on a two-stroke cycle. On a typical four-stroke Otto cycle, the first-inlet-stroke consists of a downwards motion of the piston (123), the inlet valve (112) being synchronized to open and draw in an appropriate air/fuel mixture from the inlet manifold, wherein the fuel injector (170) introduces a predetermined amount of fuel into the airstream according to predetermined parameters and at synchronized times, typically controlled by an engine computer. In the second stroke, also known as the compression stroke, the piston (123) moves upwards compressing the air/fuel into the combustion chamber (122). Typically, shortly before the piston reaches top dead centre (TDC), the air/fuel mixture is ignited by the ignitor means (118). Rapid combustion occurs, accompanied by the production of combustion gases having high temperature and pressure. In the third stroke, the power stroke, the high-pressure combustion gases force the piston (123) downwards, providing a rotary power output via the crankshaft. In the fourth-exhaust-stroke, the outlet valve (114) is synchronized to open, so that the combustion gases may flow out of the cylinder (110) as the piston (123) moves upwards to top dead centre again to commence another cycle.

The timing and duration of the spark as well as the proportions of the air/fuel mixture are important parameters which vary with engine speed and load, and which have to be controlled carefully. At steady state conditions, the fuel-air ratio remains substantially constant, at about 14.7:1. Though mechanical systems have been used in the past for control, electronic microprocessors operatively connected to suitable fuel injection systems provide greater and more reliable control, and are known in the art.

In prior art fuel systems, as fuel is provided to the air intake system at a given system pressure, the relatively low ambient pressure of the intake system results in an expansion and cooling of the fuel therein. This in turn reduces the possibility of the fuel vaporizing, and instead the fuel may form droplets, with the problems already discussed above.

Referring to FIG. 2, a typical fuel system (250) of the prior art comprises a fuel tank (201), typically underpressurised, having a fuel pump (not shown) for providing pressurized liquid fuel (typically at 2-3 bar gauge pressure) to the injectors (170) via delivery conduit (210). A return conduit (220) returns most of the unused fuel to the tank (201) via pressure valve (204), which serves to maintain the delivery fuel pressure between predetermined limits. A small amount of fuel from the supply conduit (210), typically much less than 10% of the flow, is actually injected by the injectors (170), the remainder returning to the tank. Such an arrangement is usually preferred since constant fuel delivery pressure can be more easily and more economically provided at fuel flow rates which are much higher than the smaller flow rates strictly required for providing fuel to the injectors.

Further referring to FIG. 2, the cooling system (260) of the engine is typically water-based, comprising a radiator (206) which circulates water through the engine case via a cooling jacket and water conduits (265).

The operating system according to the present invention, generally designated (900) is directed at modestly preheating fuel such that the fuel is substantially on delivery to each cylinder of the engine either the fuel injection system such that at the combustion stroke full combustion of the fuel may be substantially achieved substantially instantaneously at TDC, that is at the highest pressures available in the power stroke.

The inventors have observed that when the fuel system according to the present invention is applied to an internal combustion engine, substantial improvements in fuel consumption can be achieved by increasing the excess air ratio (also known as the air factor $\lambda$) to up to 1.8. In fact, according to the present invention, a reduction in torque may be experienced at the higher end of the excess air ratios, compared with that obtained at optimal excess air-ratios (of about 1.4), but this compares well with regular engines of the art are difficult to operate at all at the higher excess air ratios. Thus, according to the present invention, the operating system (900) comprises suitable means for supplying much higher excess air ratios than suggested by the prior art, leading to increased fuel efficiency coupled with lower levels of pollutants. In particular, the operating system (900) typically provides excess air ratios which optimize the power output, torque, and fuel consumption of the engine, when operating with the fuel heating system of the invention.

The inventors have also observed that when an operating system, and in particular a fuel system according to the present invention further comprises a combustion stability means according to the present invention, the potential benefits of the fuel system may be realized over an even longer term and more reliably that without such means.

In the present invention, the fuel is preheated to a temperature well below the vaporization temperature of the fuel at the regular fuel delivery pressure (typically 2-3 bar gauge). Typically, the fuel is heated to between 60° C. and 100° C., though preferably to between 70° C. and 85° C. The precise optimal range of temperature generally depends on the specific fuel, and for some fuels, the optimum temperature may be above 100° C., or indeed below 60° C. While these fuel temperatures and pressures are sufficiently low to ensure that the fuel is substantially completely liquid within the system, at the same time when the fuel is ejected into the air intake system, via liquid fuel injector nozzles, the sudden drop in pressure encountered in the intake system and the cooling of the fuel is insufficient to prevent vaporization thereof. Furthermore, the fuel system ensures that only liquid fuel is provided from the fuel tank to the fuel outlet in the air intake system, and with the moderate fuel temperatures and pressures therein, substantially no gaseous phase of the fuel is passed through this part of the system. In some prior art systems it is assumed that the walls of the air intake system provide a cooling effect with respect to the fuel, and therefore the fuel needs to be heated to very high temperatures to counter this effect; at the same time, a high pressure system is required to prevent premature vaporization in the system.

Figure 3A:
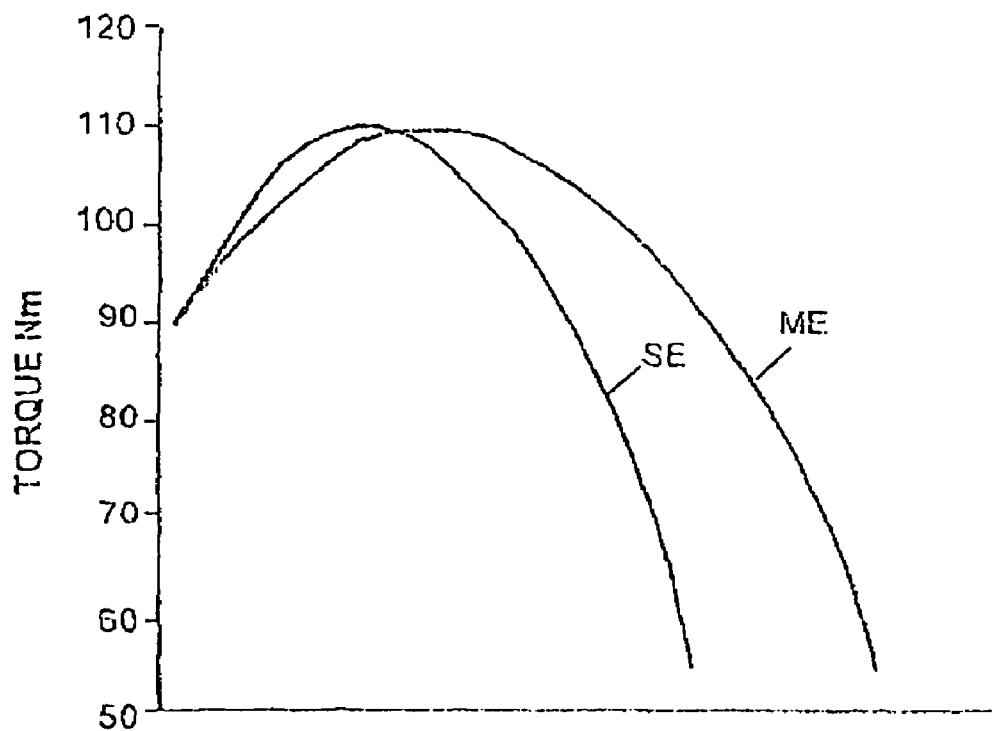
FIG. 3($a$) and FIG. 3($b$) illustrate the influence of air excess ratio on fuel consumption and torque of an engine comprising the operating system of the present invention (ME) compared with an engine of the prior art (SE).
Figure 3B:
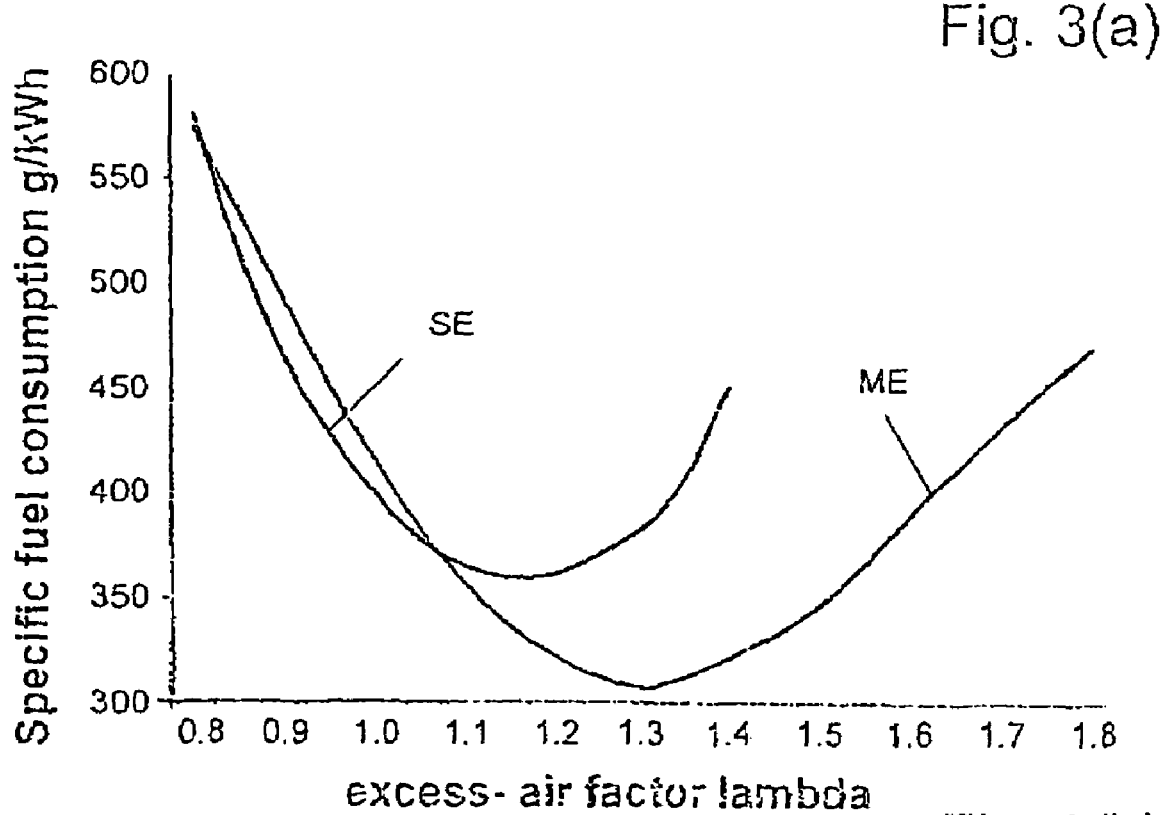

As illustrated in FIG. 3(a) and FIG. 3(b), when the engine is operated at standard excess air ratios (also known as air factor or "λ") of about 1, or within the range from about 0.96 to about 1.04, as is typically the case in the prior art, that is at fuel air ratios of about 14.7:1, the fuel preheating system of the present invention (ME) provides some benefits in the performance thereof, in terms of fuel consumption and torque, over a regular engine without this preheating (SE). Such an engine without preheating of the fuel is referred to herein as a datum engine. However, as excess air ratio is increased, almost the same maximum torque is obtained using the preheating system at λ=1.28, as is obtained with a regular engine operating at λ=1, but the specific fuel consumption is reduced considerably. The optimum excess air factor for any particular engine using the operating system of the present invention may vary from engine to engine, and typically, engines require suitable calibration to determine the ideal excess air ratio therefor. Of course, the actual excess air factor for any particular engine may vary according to engine conditions, including load, rpm, ignition timing, and fuel temperature.

The leaner fuel air mixtures required according to the present invention may be provided either by reducing the amount of fuel to the injectors, which reduces the fuel consumption, Alternatively, this may be accomplished by increasing the volume flow rate of the air introduced to the cylinder, for example by turbocharging, which increases the torque developed by the engine while maintaining moderate fuel consumption, that is a lower fuel consumption than of a regular engine with similar turbocharging, but run with regular excess air ratios and without fuel preheating.

Thus, according to the present invention, the operating system (900) comprises:— a suitable fuel system adapted for heating at least a portion of fuel to a suitable temperature prior to injection of said portion of fuel into the combustion system of the engine, wherein said temperature is below the vaporization temperature of the fuel at the delivery fuel pressure, but is sufficient such as to enable said portion of fuel to substantially vaporize at the pressure within the combustion system in which the portion of fuel is injected.

In particular, the operating system further comprises:— suitable control means for providing to said engine an air fuel ratio corresponding to a target excess air ratio substantially greater than a datum excess air ratio, wherein said datum excess air ratio is associated with at least one optimal running characteristic of a corresponding engine, wherein said corresponding engine does not comprise said means for heating in (a).

Typically, the delivery fuel pressure is less than 5 bar gauge, and more typically less than 3 bar or 1.8 bar gauge.

The datum excess air ratio for a regular engine of the art is nominally 1.0 steady state (cruising or idling), and may range in practice between about 0.96 and about 1.04.

According to the present invention, the target excess air ratio at which the engine is run is substantially greater than the nominal or datum excess air ratio for the same type of engine.

Thus, the suitable control means are typically adapted for controlling the fuel injection flow rate such as to provide an excess air ratio substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably between about 1.27 and about 1.3, and even more preferably at an excess air ratio such as to provide optimum fuel consumption and/or optimum torque.

The term combustion system is herein taken to refer primarily to a part of the air intake system upstream of the combustion chamber of a cylinder of the engine, and also includes the combustion chamber as well, particularly when the combustion chamber is in fluid communication with the upstream air intake system connected thereto. Thus, this portion of fuel may be injected directly into the combustion chamber prior to combustion therein, particularly prior to the compression stroke, but more typically, to the upstream air intake system such as to subsequently enter into the combustion chamber together with inlet air via the inlet valve.

Figure 4:
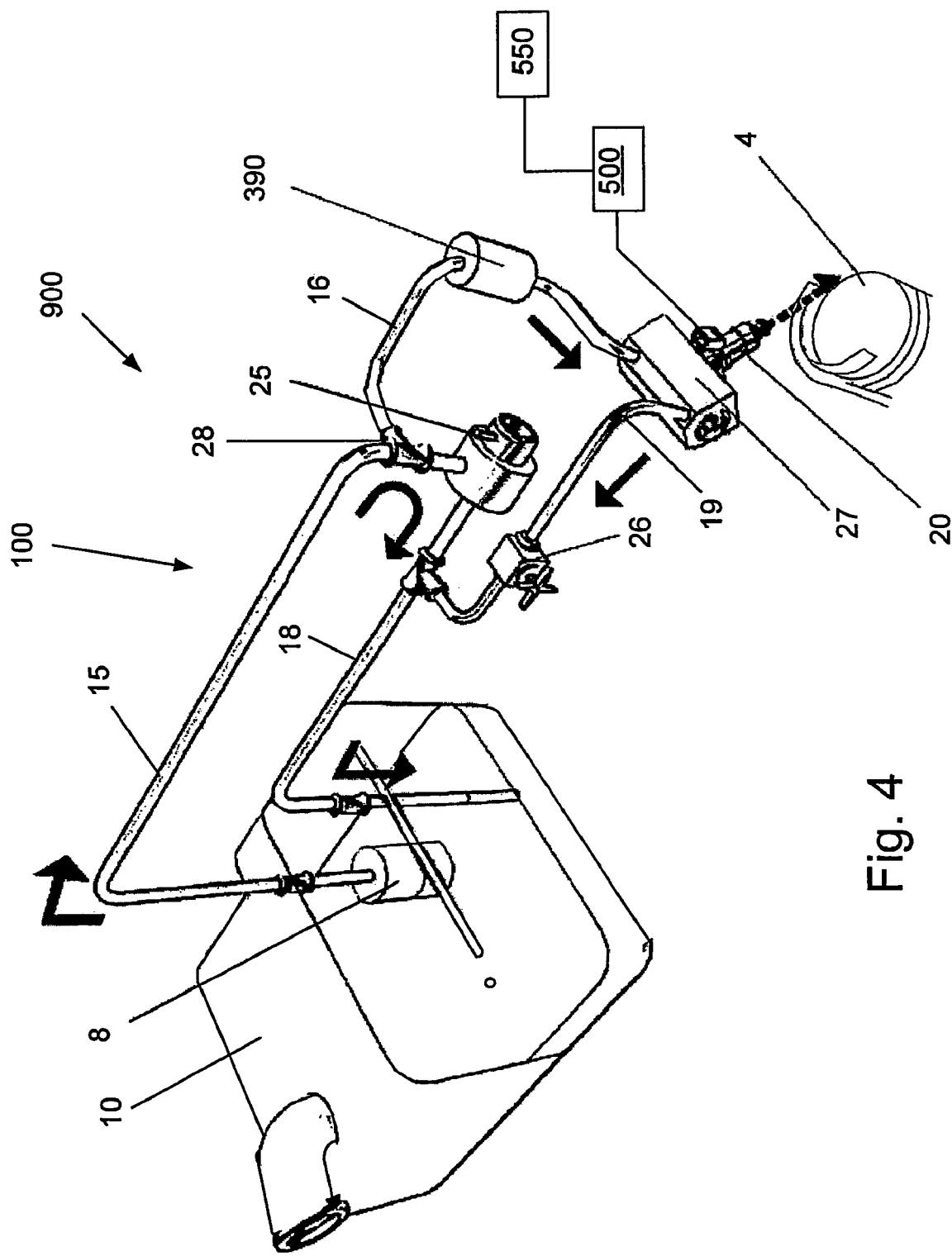
FIG. 4 illustrates in perspective view the main elements of the first embodiment of the fuel system of the present invention.

Thus, referring to FIG. 4, in the first embodiment of the present invention, the engine operating system (900) comprises a fuel system (100) for heating the fuel to a predetermined temperature, and a fuel a suitable control means (500) for controlling the excess air ratio. The fuel system (100), which is also per se novel, comprises a first fuel circuit comprising a fuel tank (10), typically an underpressurised tank, having a fuel pump (8) operatively connected to a pressure valve (25) via a primary fuel conduit (15) or the like, and a downstream primary return conduit (18). A secondary fuel circuit comprises a secondary conduit (16) that branches from the primary conduit (15) upstream of the valve (25), via a T-junction (28) or the like, and is operatively connected to the injector means (20) of adjacent cylinders, typically via plenum or common conduit (27). The injector means (20) are in selective communication with the combustion system such as to selectively provide or not provide fuel thereto, as required. The primary conduit (15) and secondary conduit (16) are sized such that only a small proportion of the fuel flow in the primary conduit (15), typically less than about 10%, is diverted to flow through the secondary conduit (16). The pressure valve (25) is adapted for maintaining a substantially constant pressure upstream thereof in the primary conduit (15) and the secondary conduit (16), typically in the region of about 2 bar to about 3 bar gauge pressure. Low pressure fuel, which may include vaporized fuel, returns to the tank (10) via primary return conduit (18) from said valve (25).

The fuel injection means (20) preferably comprises individual fuel injectors for each cylinder of the engine. Typically, the fuel injection means (20) provides fuel to the air intake system (or in Diesel-type engines, directly to the cylinders), which is typically at a pressure of about −0.6 to 0 bar gauge pressure for "atmospheric" engines, and −0.6 to 1.5 bar gauge pressure for turbocharged engines.

The fuel system (100) further comprises suitable primary heating means (300) for heating the secondary fuel flow, that is, the fuel flowing via the secondary conduits (16) and to the injector means, to a predetermined temperature, which is suitably controlled. Such heating means may comprise any suitable heating system, and may include, for example, direct electrical heating, heat-exchange with respect to a hot medium (such as the water cooling system, the oil sump, the exhaust gases, the engine block, and so on), or any other means. As mentioned before, this suitable temperature is typically below the vaporization temperature of the fuel at the delivery fuel pressure, but at the same time is sufficient to substantially vaporize the fuel at the pressure extant within the air intake system in which the fuel is injected.

Figure 5:
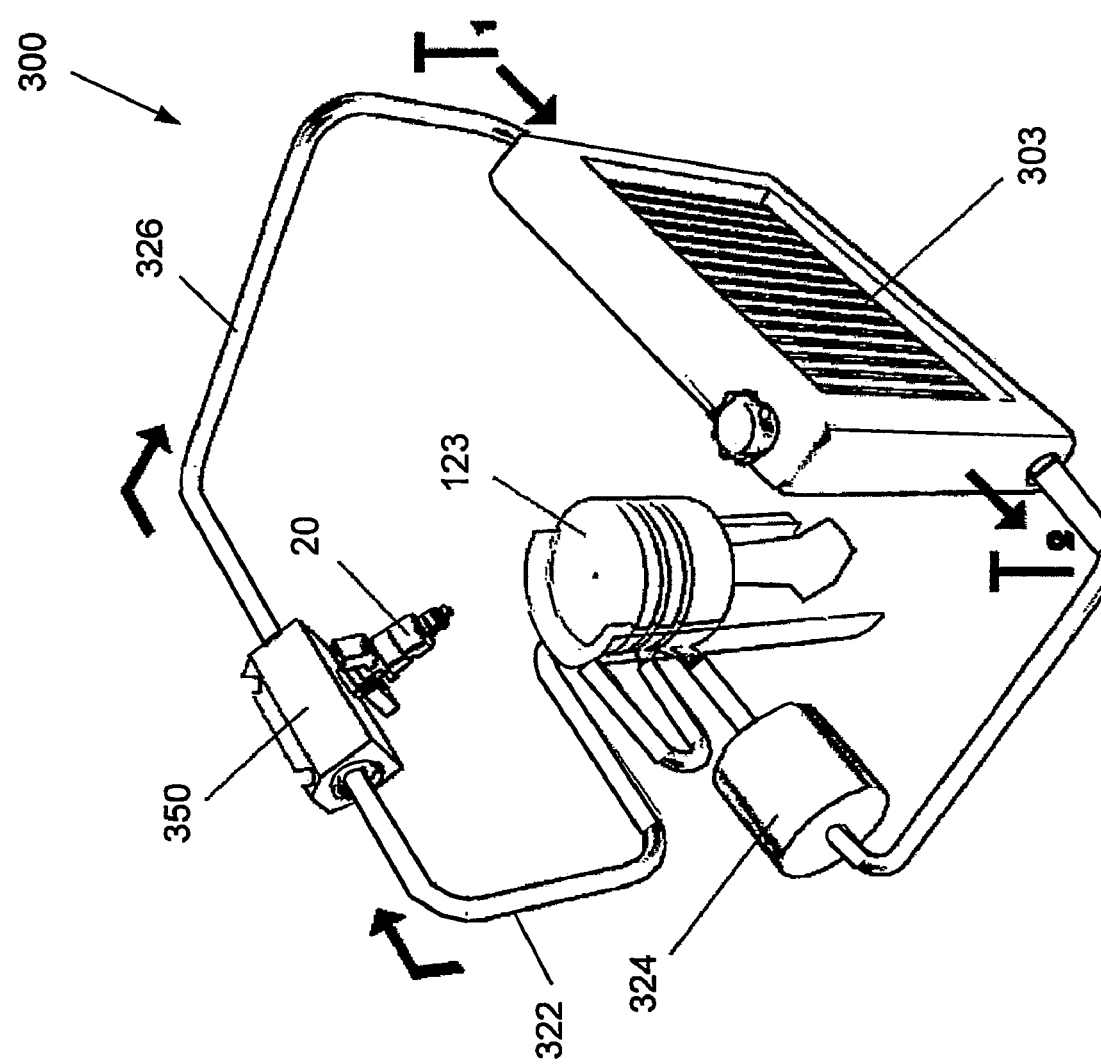
FIG. 5 illustrates in perspective view the main elements of the first embodiment of the fuel heating system of the present invention.
Figure 6A:
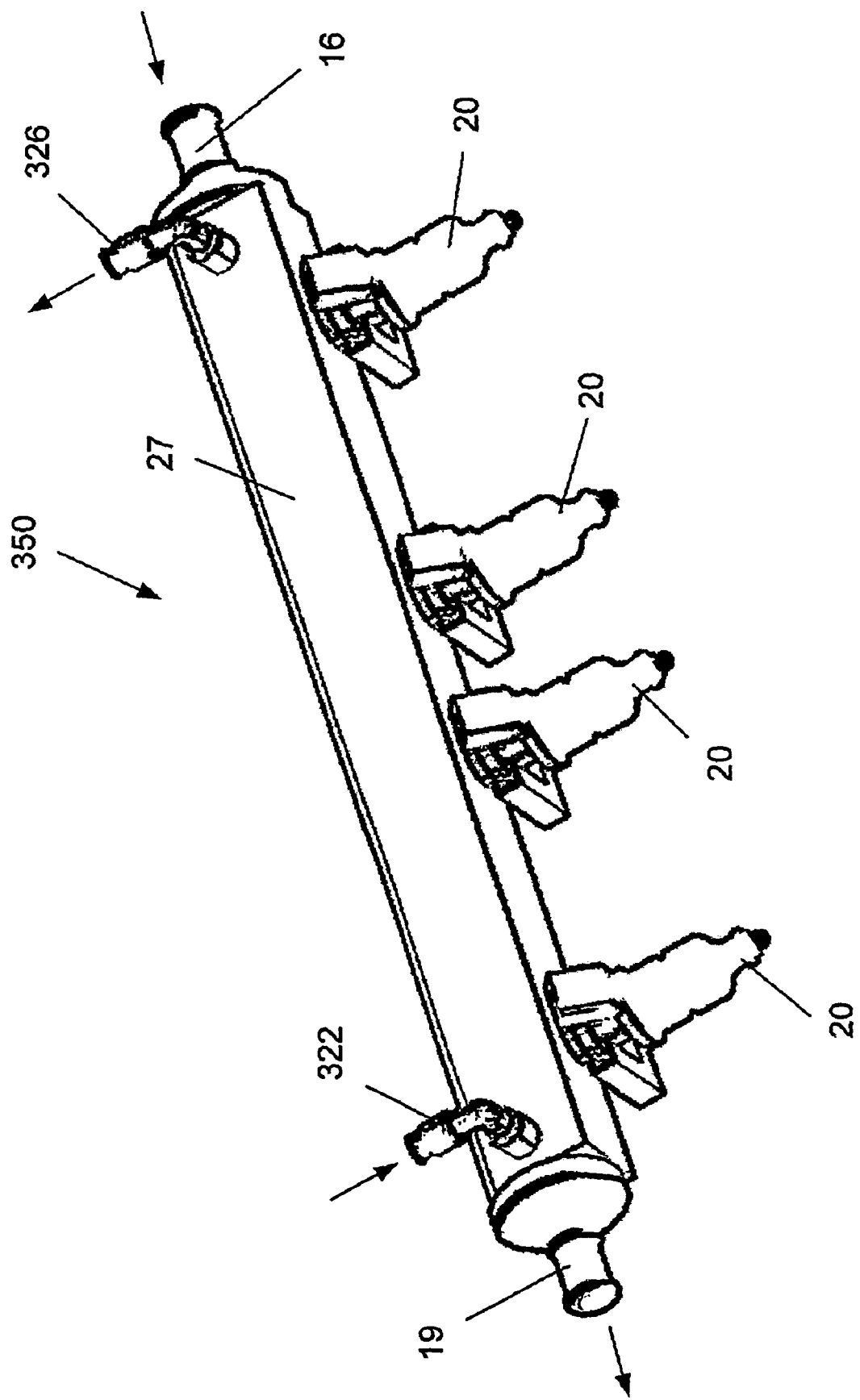
FIG. 6($a$) and FIG. 6($b$) illustrate in perspective view the heat exchanger arrangement of FIG. 5, with and without, respectively, the common conduit.
Figure 6B:
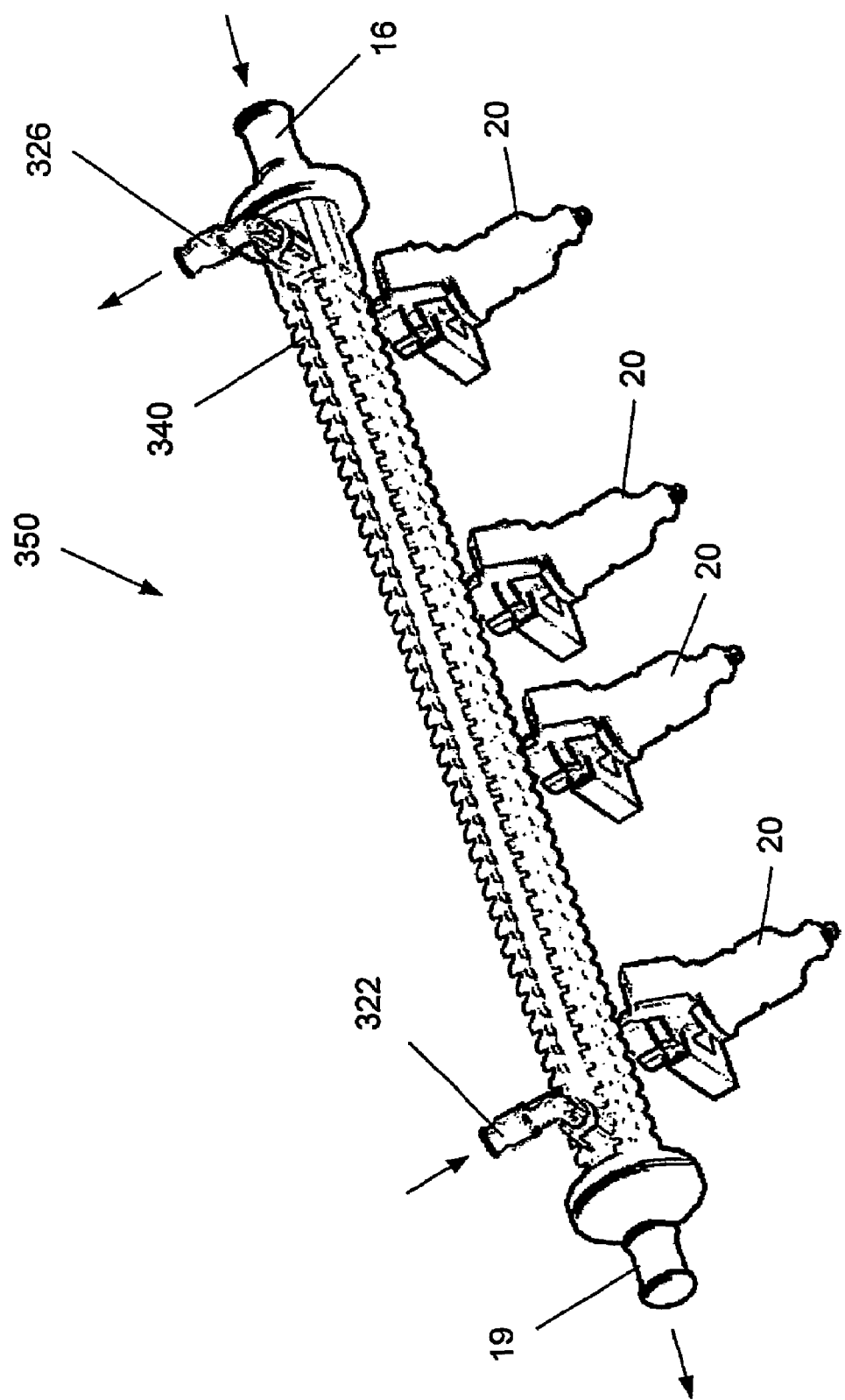

Referring to FIG. 5, FIG. 6(a) and FIG. 6(b), preferably, the primary heating means (300) utilizes waste heat from the engine cooling system to preheat the fuel. In this embodiment, the primary heating means (300) comprises a heat exchange arrangement (350), wherein a suitable heat exchange conduit (340), which is in fluid communication with the radiator (303) of the cooling system, and passes through the common conduit (27) of the injector means (20) to form an internal heat exchange volume. The heat exchange conduit (340) is preferably ribbed and/or comprises vanes such as to maximize heat exchange between the cooling water passing through the inner heat exchange conduit (340), and the fuel flowing through the jacket formed between the common conduit (27) and the heat exchange conduit (340). As illustrated in FIG. 5, the heat exchange arrangement (350) receives substantially hot water from a supply conduit (322) operatively joined thereto and to the radiator (303) via pump (324), recirculates water to the radiator (303) via return conduit (326). Thus, coolant water passes through the engine cooling system and removes excess heat from the engine block, and subsequently uses this heat to heat the fuel in the common conduit (27) prior to injection into the air intake system by the injection means (20). Particularly during cold weather, and during warming up periods of the engine after starting the same, there is generally insufficient heat in the cooling system to heat the fuel to the required temperature. Accordingly, and as illustrated in FIG. 4, a secondary heating system (390) is preferably provided, comprising, in this embodiment, an electrical heating element comprised in the secondary conduit (16), upstream of the common conduit (27).

Referring to FIG. 4, the fuel system (100) further comprises a secondary return conduit (19) operatively connecting the downstream end of the common conduit (27) to the primary return conduit (18) via a valve (26), which typically comprises a needle valve or orifice valve. The secondary return conduit (19) enables on the one hand excess fuel to be returned to the tank (10) from the secondary conduit (16). Additionally, air or fuel vapours in the common conduit (27) or upstream thereof may also be bled off to the return conduit (18) and thereafter to the tank (10). The valve (26) can be used to control the temperature of proportion of fuel flowing through the secondary conduit (16), and as a safety valve in case of overheating: the more valve (26) is opened, the greater the fuel flow via the secondary conduit (16), which in turn reduces the temperature of the fuel in the common conduit (27). Preferably, valve (26) is adjustable in an automated manner, and may be operated in any suitable way, including via mechanical, electrical, pneumatic or hydraulic means, and is preferably operatively connected to suitable control computer.

Thus, in this embodiment, only a small proportion of the fuel flow, typically 3 to 6%, and in some cases up to 10% of the fuel flow from the tank, is actually heated. This has several advantages. First, the remainder of the unheated fuel continues to the tank (10) in substantially the same manner as in prior art engines that do not pre-heat the fuel, and thus no additional hardware is required regarding this part, and thus the fuel system according to the present invention can be retrofitted relatively easily into existing engines. Secondly, as only a small proportion of the fuel is heated, excess heat from the engine can generally be used exclusively for preheating the fuel, with no penalty on the performance on the engine. Thirdly, because only a small proportion of the fuel is heated, there is relatively little danger posed by the heated fuel, and in any case the secondary return conduit (19) and valve (26) can react relatively quickly to reduce potentially dangerous fuel overheating situations. On systems in which all the fuel is heated, the fuel in the return line must be cooled before reaching the tank, and the danger posed by vaporized fuel in the fuel system increases, which in turn increases the complexity and cost of the fuel system.

The present invention is further characterized in that the operating excess air ratios are substantially greater than would be the case for the same engine without preheating of the fuel. As described above, most prior art engines operate at excess air ratios of between about 0.96 and about 1.04, and, as illustrated in FIG. 3(a) and FIG. 3(b), if such an engine were operated at substantially higher excess air ratios, say 1.3 or 1.4 the torque developed by the engine reduces by almost 50%, while the fuel consumption increases. In the present invention, the operating system enables the running conditions to be changed to provide optimum torque or fuel consumption, that is, improved fuel consumption at similar power output, or improved power output at the same fuel consumption, compared to a similar engine without fuel preheating provided by the present invention. Thus, the operating system (900) of the present invention further comprises suitable control means (500) for controlling the fuel air ratio, which is synonymous with controlling the excess air ratio, such as to provide excess air ratios greater than 1.1, preferably between 1.2 and 1.4, more preferably between 1.25 and 1.3, but may be even greater than 1.4. Such control is typically carried out by a computer that controls the operation of the injection means (20). In a similar manner to operating the injection means in prior art engines, the control means (500) determines the amount of fuel to each cylinder according to engine running parameters, such as load, rpm and so on, but additionally also reduces the amount of fuel such that at any particular condition the excess air ratio is substantially greater than 1.05, and preferably comprises a value such as to optimize the torque and/or fuel consumption obtainable in conjunction with the fuel system (100). Additionally or alternatively, the control system (500) may be operatively connected to the engine supercharger or turbocharger (550), when indeed the engine comprises such a device for increasing air volume flow rate, in which case, the control system (500) may control any one or both of the amount of fuel supplied to the injector means (20) and the volume flow rate of the air provided by the supercharger or turbocharger (550). The precise algorithm, truth table, or other means for determining what value of excess air ratio to apply for any given situation or engine condition may depend on each particular type of engine, on the type of fuel used, on whether or not a turbocharger or supercharger is used, on how much the fuel is to be preheated, on whether the engine is running steady state, accelerating, decelerating, or idling, on the efficiency of vaporization of fuel by means of the fuel system of the invention, and so on, and the fuel-air ratio control means is suitably programmed accordingly. Thus, the control means (500) is operatively connected to the injector means (20) of the engine, as well as to any number of suitable sensors (not shown) that provide data to the control means (500) regarding engine conditions. The control system (500) may be in the form of a separate device that is also operatively connected to the engine computer, or to the fuel injection controller. Alternatively, the control system (500) may be incorporated within the engine computer or fuel injection controller, in other words, the engine computer or fuel injection controller is correspondingly programmed to operate in the manner described for the control system (500).

Preferably, the operating system, and in particular the fuel system of the present invention is installed in an engine together with a suitable medium or additive atomizing system.

Figure 7:
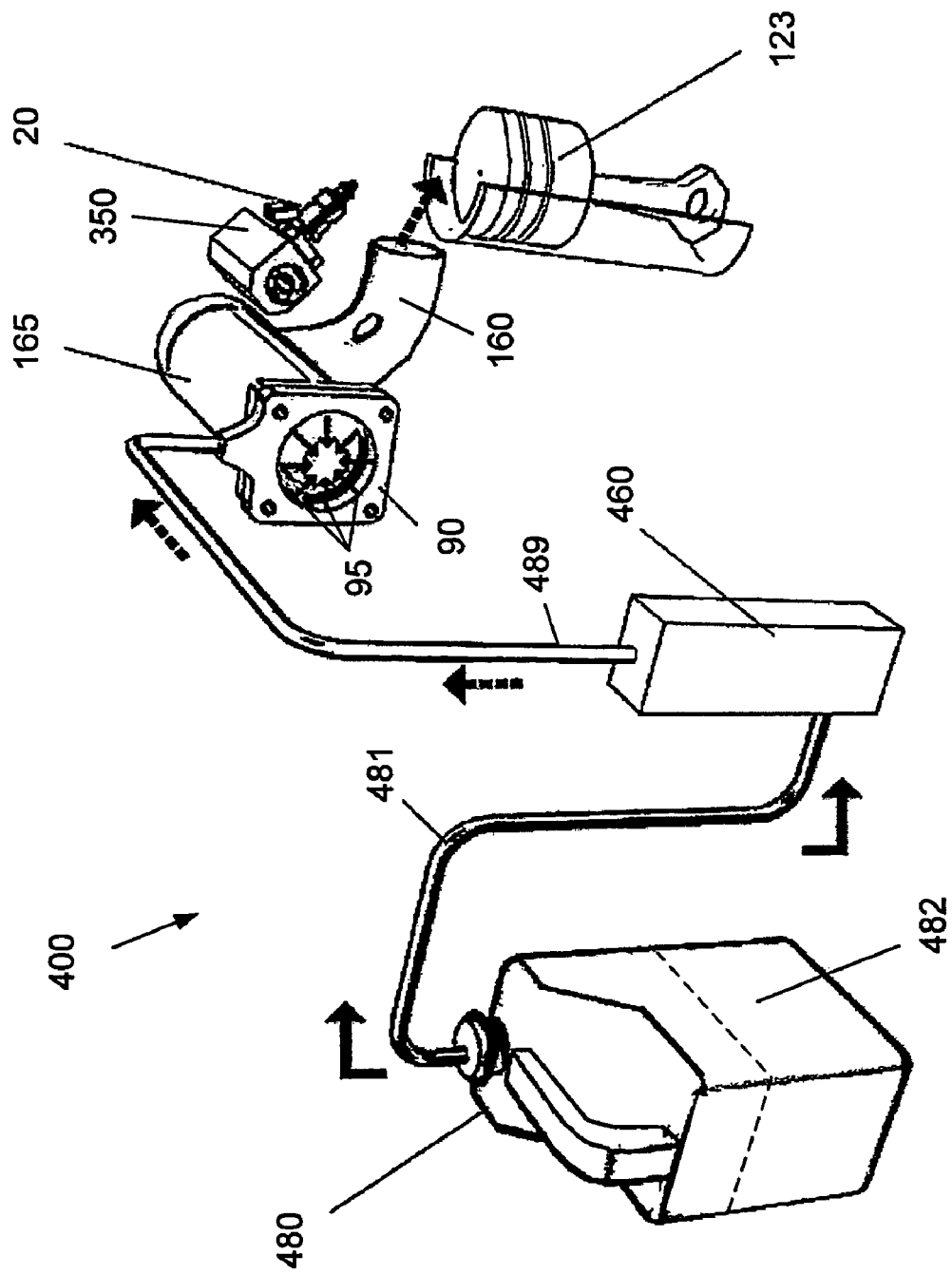
FIG. 7 illustrates in perspective view the main elements of the first embodiment of the additive atomizing system of the present invention.
Figure 8:
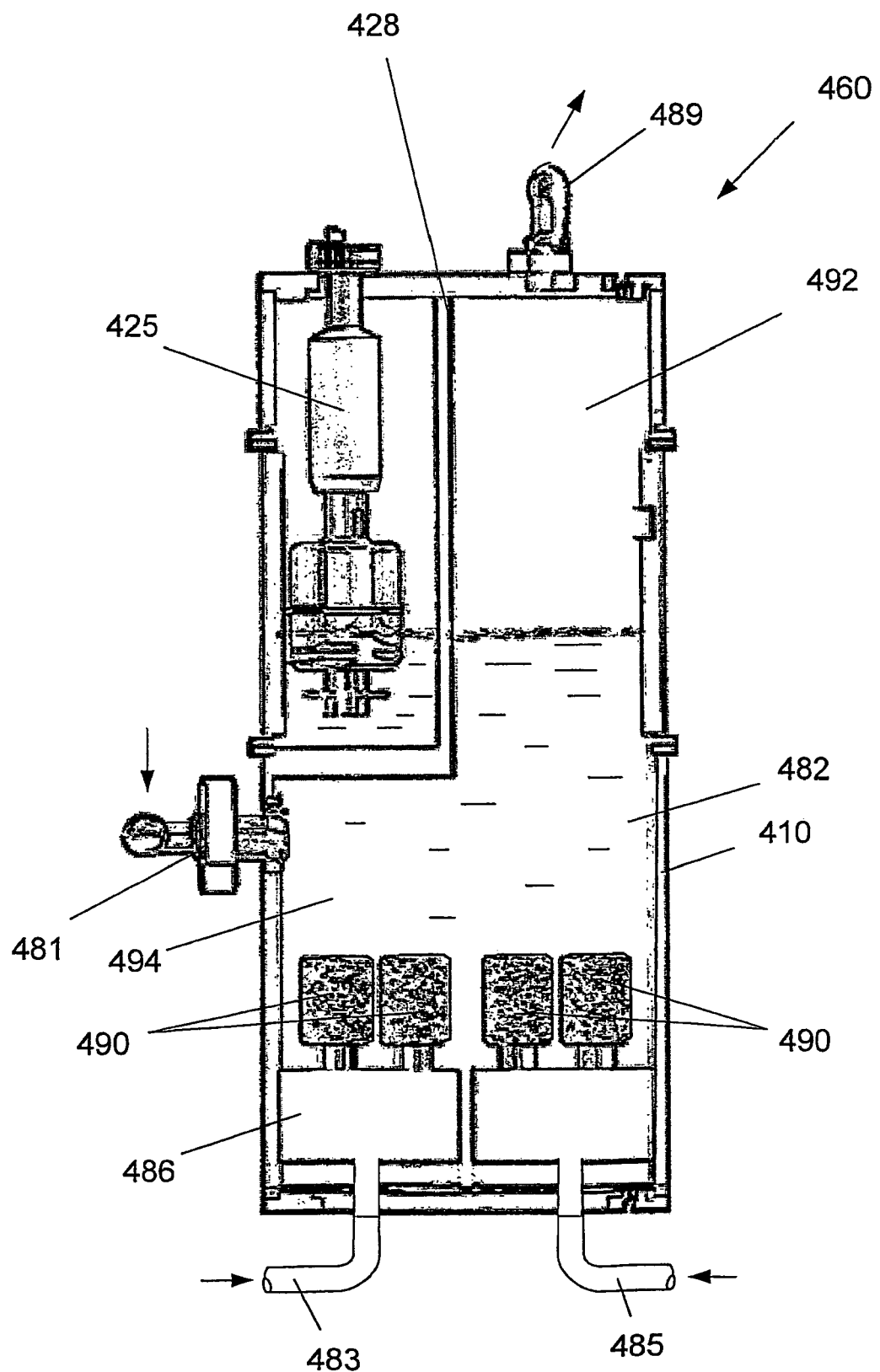
FIG. 8 illustrates in cross-sectional transverse view the additive atomizing unit of FIG. 7.

Referring to FIG. 7 and FIG. 8, the additive atomizing system (400) according to one embodiment thereof comprises a refillable reservoir (480) for holding a suitable volume of a suitable medium or additives (482) and for supplying the same to a suitable additive atomizing unit (460) via a line or conduit (481).

The additive atomizing unit (460) is provided for breaking up, atomizing and aerating the said medium (482). The additive atomizing unit (460) is typically mounted close or onto the engine in order to maximize heat transfer to the additive atomizing unit (460). The additive atomizing unit (460) preferably comprises a housing (410) defining an inner chamber (494). Air is supplied to the bottom end (483) of the chamber (494) via two separate inlet conduits (483), (485), typically comprising suitable filters. Each of the inlet conduits (483), (485) delivers air to the chamber (494) through one or more aerators (490) for aerating the medium (482).

Heat exchange between the additive atomizing unit (460) and the engine heats up the medium (482) and enables the medium to be at least partially vaporized. Alternatively, two or more than two such chambers may be provided. Vaporized and aerated medium (482) is collected in the upper space (492) or volume of the chamber (494), and then siphoned off to the engine air intake system, optionally via adjustable vacuum pump (not shown), and line (489). Preferably, the air intake system provides the necessary low pressure required. The additive atomizing unit (460) is kept supplied with medium (482) via line (481) and a suitable automatic filler means (not shown), typically an electrically controlled valve, which responds to a drop in level of the medium (482) detected by suitable level detector (425). Alternatively, filling may be done by utilizing a suitable vacuum. The level detector (425) typically comprises, for example, an arrangement including a float and solenoid, and a suitable guard (428) may be utilized to prevent excessive migration of the float within the additive atomizing unit (460). Suitable control means by computer or microswitch connected to throttle enable either one or both air conduits (483), (485) to deliver air to the chamber (494), according to the running conditions of the engine. Typically, one air conduit, say conduit (483) for example, delivers air all the time that the atomizing unit (460) is operating, while at conditions of higher engine loads, both conduits (483), (485) are used. The vapour is at low pressure and low temperature.

Referring to FIG. 7, advantageously, the downstream end of the line or conduit (489) from the additive atomizing unit (460) comprises a distribution collar (90) which is located in the air intake system (165) of the engine, just upstream of the air manifold means, or indeed incorporated therein. The distribution collar (90) comprises a plurality of ejection nozzles or apertures (95) substantially radially and uniformly disposed and pointing inwardly into the air intake duct, to provide a substantially homogenous distribution of aerated medium (482) within the air inlet system (165), particularly at the intake duct or intake manifold.

The medium (482) preferably comprises a mixture of methanol or the like, including ethanol and any organic alcohol, and acetic acid or the like. The percentage of methanol or the like is typically between 60% and 80% by volume, and thus the percentage of acetic acid or the like is between 20% and 40%, respectively. The acetic acid or the like is typically of between 3% and 5% concentration by volume in water. The aerated medium (482) comprises a suspension of fine liquid droplets of the medium in a stream of air mixed with vaporized fuel.

Alternatively, the medium may be sprayed directly into the intake manifold by means of a suitable spray injector or nozzle in communication with the reservoir (480), without previously aerating the medium.

Figure 9:
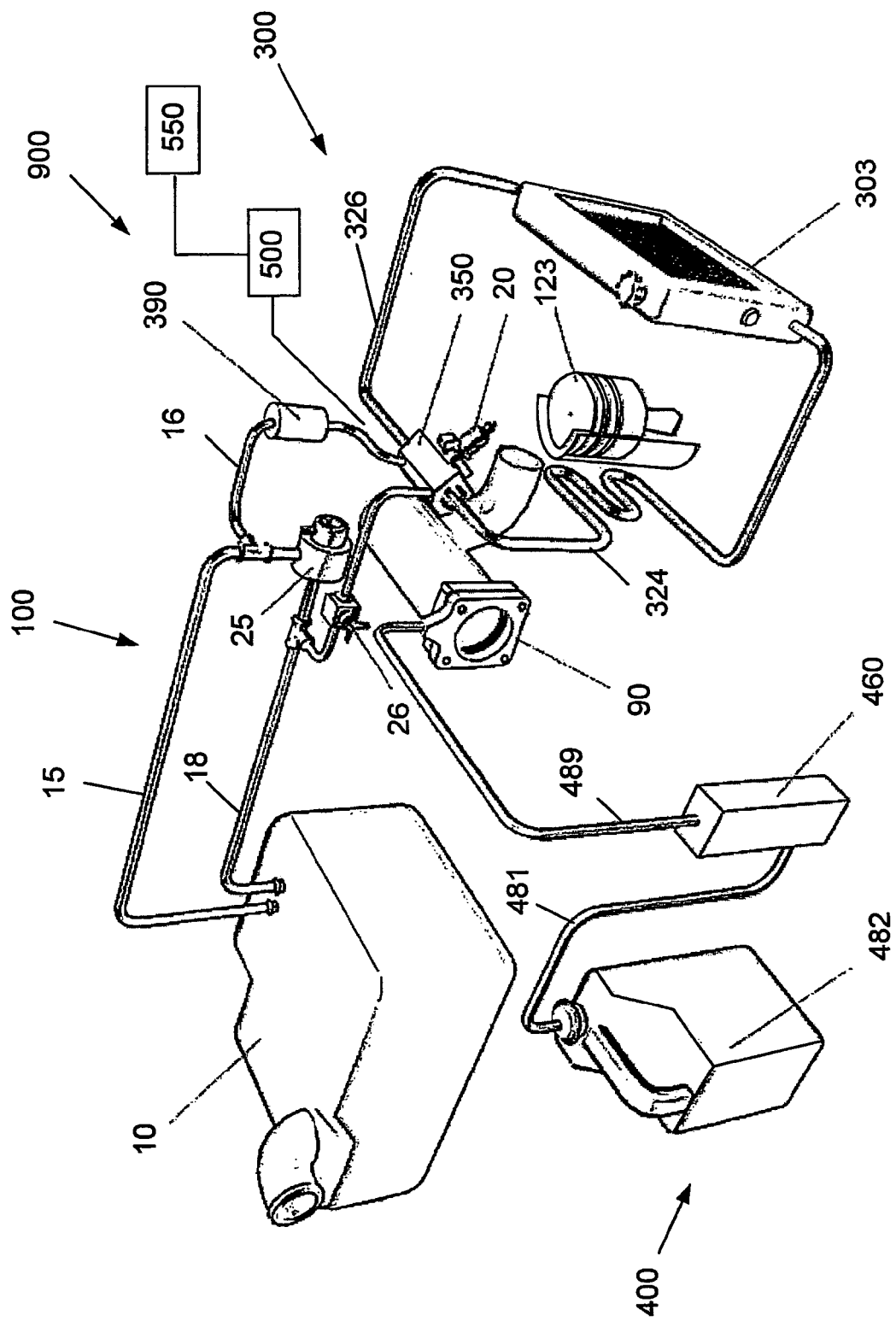
FIG. 9 illustrates in perspective view the main elements of the first embodiment of the system of the present invention.

FIG. 9 conveniently illustrates the main elements of the fuel system (100), the heating system (300) and the additive atomizing system (400).

The fuel system (100) of this embodiment is particularly suited for retrofitting to regular engines. Thus, referring to FIG. 2 and FIG. 4, a regular engine of the prior art illustrated in FIG. 2 may be modified as follows. First, a T-junction and is provided in the conduit (210), so that the main fuel flow is directed to pressure valve (204), while maintaining fluid communication with the injector means (170), via an optional heater (390), as illustrated in FIG. 4. The return conduit (220) from the injector means is re-routed from the valve (204) to a bleeding valve (26) as illustrated in FIG. 4, and another T-junction connects the downstream end of the pressure valve (204) to the bleeding valve (26) and the return conduit (220). Then, the injector means may be modified as shown in FIGS. 4, 5, 6(a) and 6(b) to provide heating for the fuel prior to injection into the air inlet system of the engine, for example, or alternatively any suitable means may be employed for heating the fuel. Optionally, and preferably, an additive atomizing system (400), as illustrated in FIGS. 7 and 8 may also be provided to the engine. Optionally a supercharger or turbocharger (550) may also be installed in the engine. Finally, the engine may be fully retrofitted with the operating system of the present invention, wherein in addition to the modifications outlined above, a control unit (500) may be also installed in the engine, or alternatively the engine computer or fuel injection controller may be adjusted or reprogrammed to operate as said engine controller.

Thus, the present invention also relates to a kit for retrofitting an internal combustion engine with an operating system, comprising heating means for heating at least a portion of fuel to a predetermined temperature prior to delivery of said portion of fuel into the combustion system of the engine, wherein said temperature is below the vaporization temperature of the fuel at the delivery fuel pressure, but is sufficient such as to enable said portion of fuel to substantially vaporize at the pressure within the combustion system in which the portion of fuel is delivered. The predetermined temperature is typically in the range of between about 60° C. and about 100° C., and preferably between 70° C. and about 85° C.

The kit is typically for use with engine that comprises:— a primary fuel circuit comprising a fuel tank operatively connected to a pressure valve via an upstream primary conduit and a downstream primary return conduit, said primary fuel circuit comprising fuel injection means upstream of said pressure valve, said fuel injection means being in selective communication with the combustion system of the engine;

and said kit comprises:— first conduit means for re-routing the said primary conduit directly from tank to said pressure valve rather than from said tank to said fuel injection means;

(ii) second conduit means for operatively connecting said fuel injection means to said first conduit means;

(iii) third conduit means for operatively connecting the downstream end of said fuel injection means to said primary return conduit rather than to said pressure valve (iv) suitable fuel heating means for heating the fuel in said fuel injection means.

The said first conduit means and said second conduit means are typically adapted for channeling said portion of the delivery fuel flow provided by the primary fuel conduit from the tank. The said portion may comprise more about 10% of the said delivery fuel flow, and preferably from about 2% to about 5% of the said delivery fuel flow, and preferably said portion of fuel is substantially the amount of fuel required to be provided to the engine via the fuel injection means.

The said third conduit means circuit preferably comprises a suitable second pressure valve in said secondary return conduit.

The heating means of the kit preferably comprises suitable temperature sensing means for sensing fuel temperature therein, said temperature sensing means being operatively connected to a suitable controller, and wherein said controller is operatively connected to said second pressure valve. The controller is adapted for opening said second pressure valve and diverting fuel flow from said heating means when said fuel temperature sensed by said temperature sensing means exceeds a predetermined limit.

The kit preferably further comprises:— suitable control means for providing to said engine an air fuel ratio corresponding to a target excess air ratio substantially greater than a datum excess air ratio, wherein said datum excess air ratio is associated with at least one optimal running characteristic of the engine in the absence of said kit.

The target excess air ratio is substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.3, and preferably said target air excess ratio is such as to provide at least one optimal running characteristic for said engine, which may include at least one of optimum fuel consumption and optimum torque for the engine.

The kit may be adapted such that the target excess air ratio at any engine condition is provided by delivering a lower fuel flow to said combustion system in relation to the corresponding fuel flow delivered in said corresponding engine in the absence of said kit and when run at substantially the same engine condition, and the said control means may be operatively connected to said fuel injection means of the engine.

Alternatively or additionally, the target excess air ratio at any engine condition may be provided by delivering a higher air flow to said combustion system in relation to the corresponding air flow delivered in said corresponding engine in the absence of said kit and when run at substantially the same engine condition. The higher air flow may be delivered by means of a turbocharger comprised in the air inlet system of the engine; the control means may be operatively connected to said air intake means and may comprise a suitable computer means, which may be comprised in the fuel injection control computer of the engine.

The present invention also relates to a method for retrofitting an internal combustion engine with an operating system wherein said engine comprises:— a primary fuel circuit comprising a fuel tank operatively connected to a pressure valve via an upstream primary conduit and a downstream primary return conduit, said primary fuel circuit comprising fuel injection means upstream of said pressure valve, said fuel injection means being in selective communication with the combustion system of the engine;

and wherein said method comprises:— re-routing the said primary conduit directly from tank to said pressure valve rather than from said tank to said fuel injection means;

(ii) operatively connecting said fuel injection means to said re-routed primary conduit;

operatively connecting the downstream end of said fuel injection means to said primary return conduit rather than to said pressure valve providing suitable fuel heating means for heating the fuel in said fuel injection means.

In step (ii), a portion of the fuel flow from the tank may be channeled to said fuel injection means. The said portion may comprise more about 10% of the said delivery fuel flow, and preferably from about 2% to about 5% of the said delivery fuel flow, and is preferably substantially the amount of fuel required to be provided to the engine via the fuel injection means.

The method preferably further comprises the step of providing a suitable secondary pressure valve between a downstream end of said fuel injection means and said primary return conduit. The method preferably includes further providing said heating means with suitable temperature sensing means for sensing fuel temperature therein, and a suitable controller operatively connected to said temperature sensing means and to said second pressure valve. The said controller is preferably adapted for opening said second pressure valve and diverting fuel flow from said heating means when said fuel temperature sensed by said temperature sensing means exceeds a predetermined limit.

The retrofit method preferably further comprises:—

(iii) providing suitable control means for providing to said engine an air fuel ratio corresponding to a target excess air ratio substantially greater than a datum excess air ratio, wherein said datum excess air ratio is associated with at least one optimal running characteristic of the engine in the absence of said heating means.

The said target excess air ratio is preferably substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.3. Preferably, the target air excess ratio is such as to provide at least one optimal running characteristic for said engine, which may include at least one of optimum fuel consumption and optimum torque for the engine.

In the retrofit method, the target excess air ratio at any engine condition may be provided by delivering a lower fuel flow to said combustion system in relation to the corresponding fuel flow delivered in said corresponding engine in the absence of said retrofitting and when run at substantially the same engine condition. The control means may be operatively connected to said fuel injection means of the engine.

Alternatively or additionally, the target excess air ratio at any engine condition may be provided by delivering a higher air flow to said combustion system in relation to the corresponding air flow delivered in said corresponding engine in the absence of said retrofitting and when run at substantially the same engine condition, and the higher air flow may be delivered by means of a turbocharger comprised in the air inlet system of the engine. The control means may be operatively connected to said air intake means, and may comprise a suitable computer means, which may be comprised in the fuel injection control computer of the engine.

Figure 10:
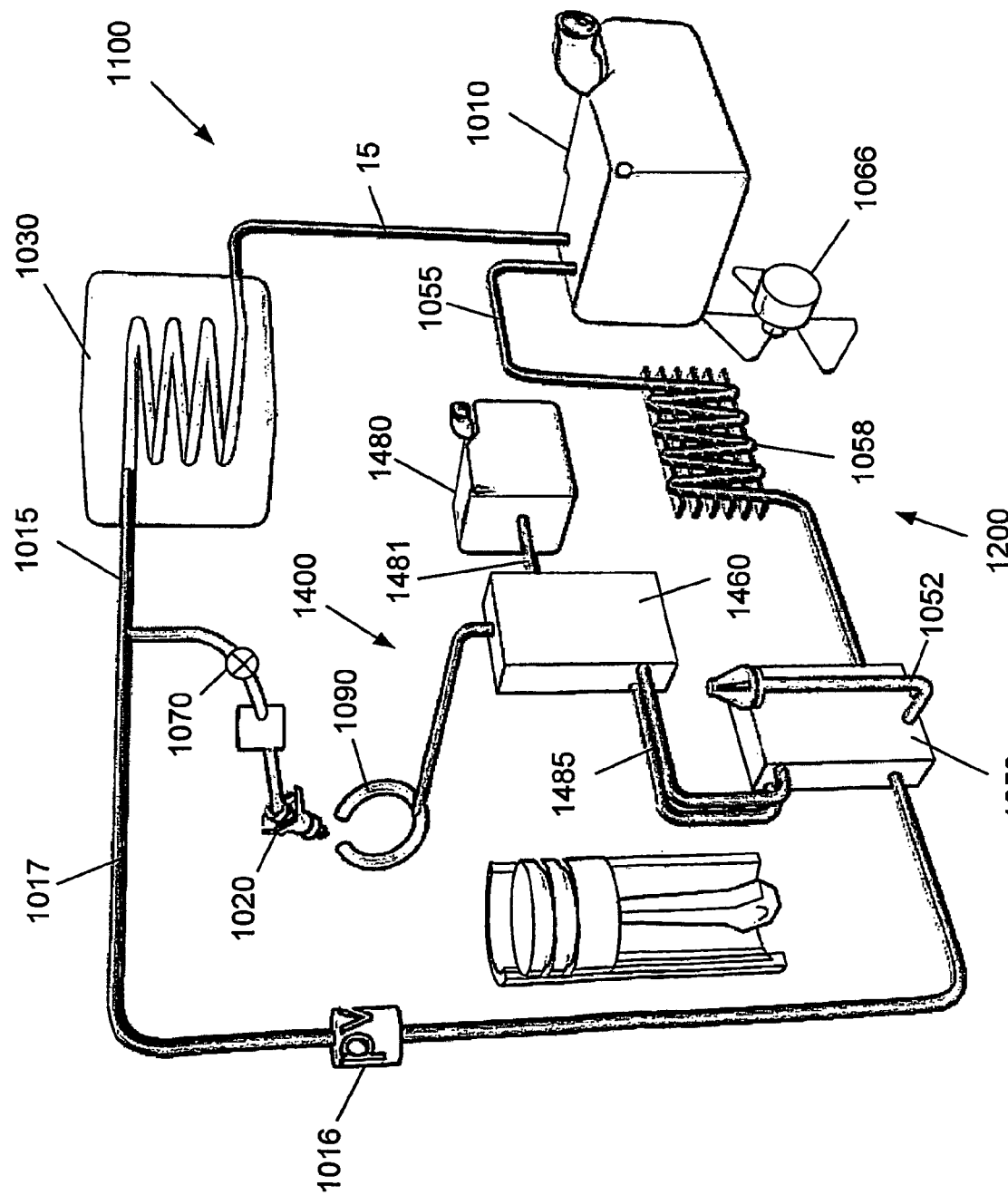
FIG. 10 illustrates in perspective view the main elements of the second embodiment of the system of the present invention.

Referring to FIG. 10, in the second embodiment of the present invention, the operating system comprises a control system as hereinbefore described with respect to the first embodiment, mutatis mutandis, and a fuel system, generally designated by the numeral (1100). The fuel system (1100) according to the second embodiment comprises a fuel tank (1010), operatively connected to the fuel injector means (1020) via one or more primary fuel lines or conduits (1015). The fuel injector means (1020) preferably comprises individual fuel injectors for each cylinder of the engine. Typically, the fuel injector means (1020) provides fuel to the air intake system (or in Diesel-type engines, directly to the cylinders), which is typically at a pressure of about −0.6 to 0 bar gauge pressure for "atmospheric" engines, and −0.6 to 1.5 bar gauge pressure for turbocharged engines.

In contrast to the first embodiment, in the second embodiment, all of the fuel flowing from the tank (1010) is heated, and while a small proportion of the fuel is injected into the cylinders, the remainder returns to the tank (1010) after having been cooled, as will be further described herein.

Thus, a fuel heating means (1030) is provided for the conduits (1015) such as to enable the fuel therein to be heated to predetermined temperature while flowing to the fuel injector means (1020), and suitable control means (not shown) are provided to ensure that the fuel is not overheated above this temperature. As with the first embodiment, significant improvements in performance (as discussed hereinbelow) begin to become significant at fuel temperatures of around 60° C. Optimum fuel temperatures were found to be around 70° C. to 85° C., and increasing fuel temperatures beyond this had little effect on performance. However, by heating all of the fuel, and then cooling the unused fuel to enable its return to the tank, additional energy is required than in the first embodiment.

The fuel heating means (1030) may comprise a heater, preferably an electrical heated operatively connected to the electrical system of the engine. Additionally or alternatively, the fuel heating means (1030) may comprise a heat exchanger operatively connected to the cooling system or any other hot part of the engine, as described for example with respect to the first embodiment, mutatis mutandis.

A suitable pump (not shown), operatively connected to the primary fuel conduit (1015), pressurizes the fuel to a pressure of about 2 to 3 bar gauge pressure.

Just upstream of the fuel injector means the primary fuel conduit branches off into a secondary fuel conduit (1017), which diverts a major portion of the fuel flow, typically more than 90%, and preferably about 94% to 97%, of the total fuel flow through the primary fuel conduit (1015), to liquid trap (1050) via a suitable valve (1016). Thus, through the downstream portion of primary conduit (1015), between the branch (1017) and the injection means (1020), flows the relatively small fuel flows that are to be provided to the injection means (1020).

The pressure in the secondary fuel line or conduit (1017) downstream of valve (1016) is reduced, typically to about 0.15 bar gauge pressure, by means of pressure valve (1016), which thus maintains relatively high fuel pressure at the injectors means.

Preferably, the primary fuel line (1015) comprises an auxiliary heater (1070) just upstream of the fuel injector means (1020) for further heating the fuel, which is useful when initially starting the engine, particularly in cold weather.

The secondary conduit (1017) delivers the excess hot fuel to a liquid trap (1050), wherein fuel vapours are separated from liquid fuel. The liquid trap (1050) also comprises an air inlet (1052). The liquid fuel is channeled to a refrigeration or cooling system (1200), which may comprise, for example, a radiator arrangement (1058) coupled to a convector fan (1066), such as to cool the temperature of the liquid fuel sufficiently to enable the fuel to be returned to tank (1010) via conduit (1055) in a safe manner.

The second embodiment also preferably comprises an additive atomizing system (1400) similar to that described with respect to the first embodiment, mutatis mutandis, with the differences described herein. As with the first embodiment, the additive atomizing system (1400) also comprises a refillable reservoir (1480) for holding a suitable volume of a suitable medium (482) and for supplying the same to a suitable additive atomizing unit (1460) via a line or conduit (1481), and a suitable collar (1090) for providing the atomized medium to the air intake system (165) of the engine. However, rather than providing just air via the lower air inlets, a mixture of air and gaseous fuel from the liquid trap (1050) is instead supplied to the bottom end of the chamber via filters and the inlet pipes (1485).

Figure 11:
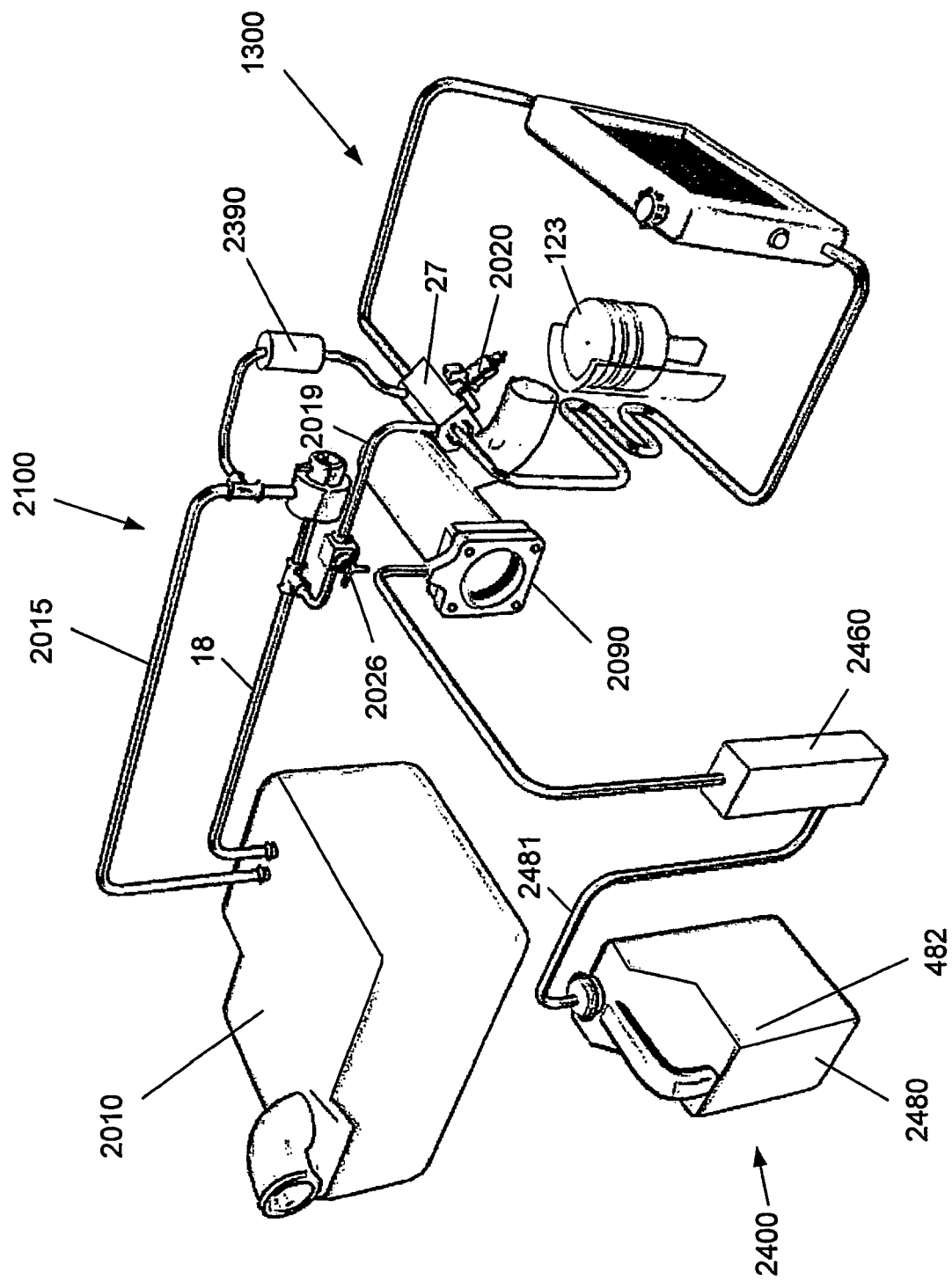
FIG. 11 illustrates in perspective view the main elements of the third embodiment of the system of the present invention.

Referring to FIG. 11 in the third embodiment of the present invention, the operating system comprises a control system as hereinbefore described with respect to the first embodiment, mutatis mutandis, and a fuel system, generally designated by the numeral (2100). The fuel system (2100) according to the third embodiment comprises a fuel tank (2010), operatively connected to the fuel injector means (2020) via one or more primary fuel lines or conduits (2015). The fuel injector means (2020) preferably comprises individual fuel injectors for each cylinder of the engine. Typically, the fuel injector means (2020) provides fuel to the air intake system or directly to the cylinders, which is typically at a pressure of about −0.6 to 0 bar gauge pressure for "atmospheric" engines, and −0.6 to 1.5 bar gauge pressure for turbocharged engines.

As opposed to the first or second embodiments, in the third embodiment, only the required fuel is provided on demand from the tank (2010), and thus the fuel flow rate from the tank (2010) is substantially less than in the first and second embodiments. Nevertheless, all of the fuel flowing from the tank (2010) is heated, and subsequently injected into the cylinders, and typically no fuel remains to be returned to the tank (2010), as will be further described herein.

Thus, a fuel heating means (1300) is provided for the conduits (2015) such as to enable the fuel therein to be heated to predetermined temperature while flowing to the fuel injector means (2020). The said fuel heating means, (1300) may be similar to that described with respect to the first or second embodiments, mutatis mutandis. As with the first and second embodiments significant improvements in performance (as discussed hereinbelow) begin to become significant at fuel temperatures of around 60° C. Optimum fuel temperatures were found to be around 70° C. to 85° C., and increasing fuel temperatures beyond this had little effect on performance.

A suitable pump and control system (not shown), operatively connected to the primary fuel conduit (2015), pressurizes the fuel to a pressure of about 2 to 3 bar gauge pressure, albeit at low fuel flow rates required.

Preferably, the fuel system (2100) further comprises a return conduit (2019) operatively connecting the downstream end of the common conduit (27) to the tank (2010) via a valve (2026). The return conduit (2019) enables on the one hand excess fuel to be returned to the tank (2010) from the common conduit (27). Additionally, air or fuel vapours in the common conduit (27) or upstream thereof may also be bled off to the return conduit (2019) and thereafter to the tank (2010). The valve (2026) can be used to control the temperature of proportion of fuel flowing through the primary conduit (2015), and as a safety valve in case of overheating: the more valve (2026) is opened, the greater the fuel flow via the conduit (2015), which in turn reduces the temperature of the fuel in the common conduit (27). Preferably, valve (2026) is adjustable in an automated manner, and may be operated in any suitable way, including via mechanical, electrical, pneumatic or hydraulic means, and is preferably operatively connected to suitable control computer. Thus, when the valve (2026) is closed or only slightly opened, this maintains relatively high fuel pressure at the injectors means.

Preferably, the primary fuel line (2015) comprises an auxiliary heater (2390) just upstream of the fuel injector means (2020) for further heating the fuel, which is useful when initially starting the engine, particularly in cold weather.

The third embodiment also preferably comprises an additive atomizing system (2400) similar to that described with respect to the first embodiment, mutatis mutandis, including a refillable reservoir (1480) for holding a suitable volume of a suitable medium (482) and for supplying the same to a suitable additive atomizing unit (2460) via a line or conduit (2481), and a suitable collar (2090) for providing the atomized medium to the air intake system (165) of the engine.

As with the first embodiment, the second and third embodiments are also preferably operated at leaner fuel-air ratios than suggested by the prior art, in a similar manner to that described for the first embodiment, mutatis mutandis.

Figure 12:
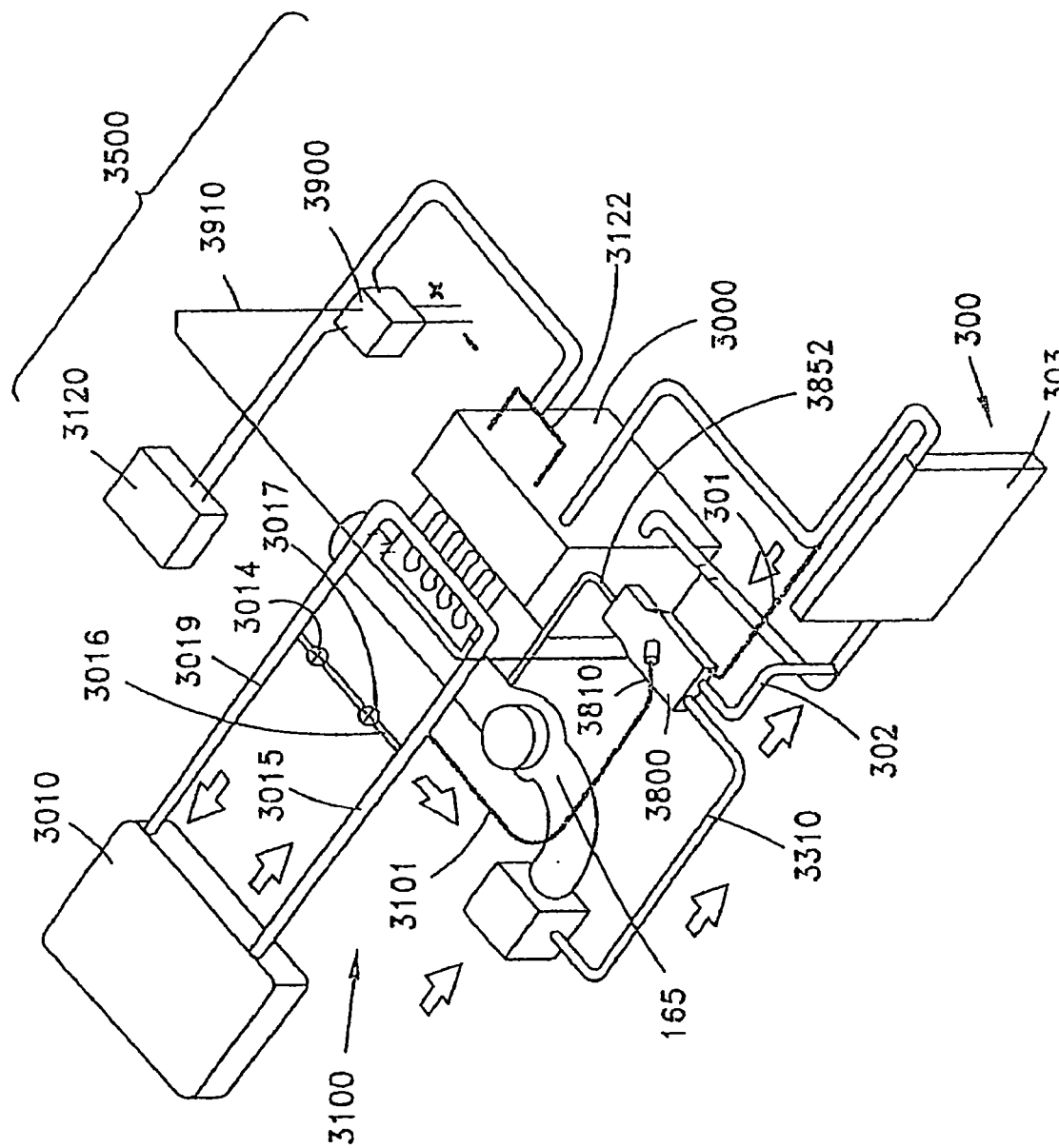
FIG. 12 illustrates the main elements of the fourth embodiment of the system of the present invention.
Figure 13:
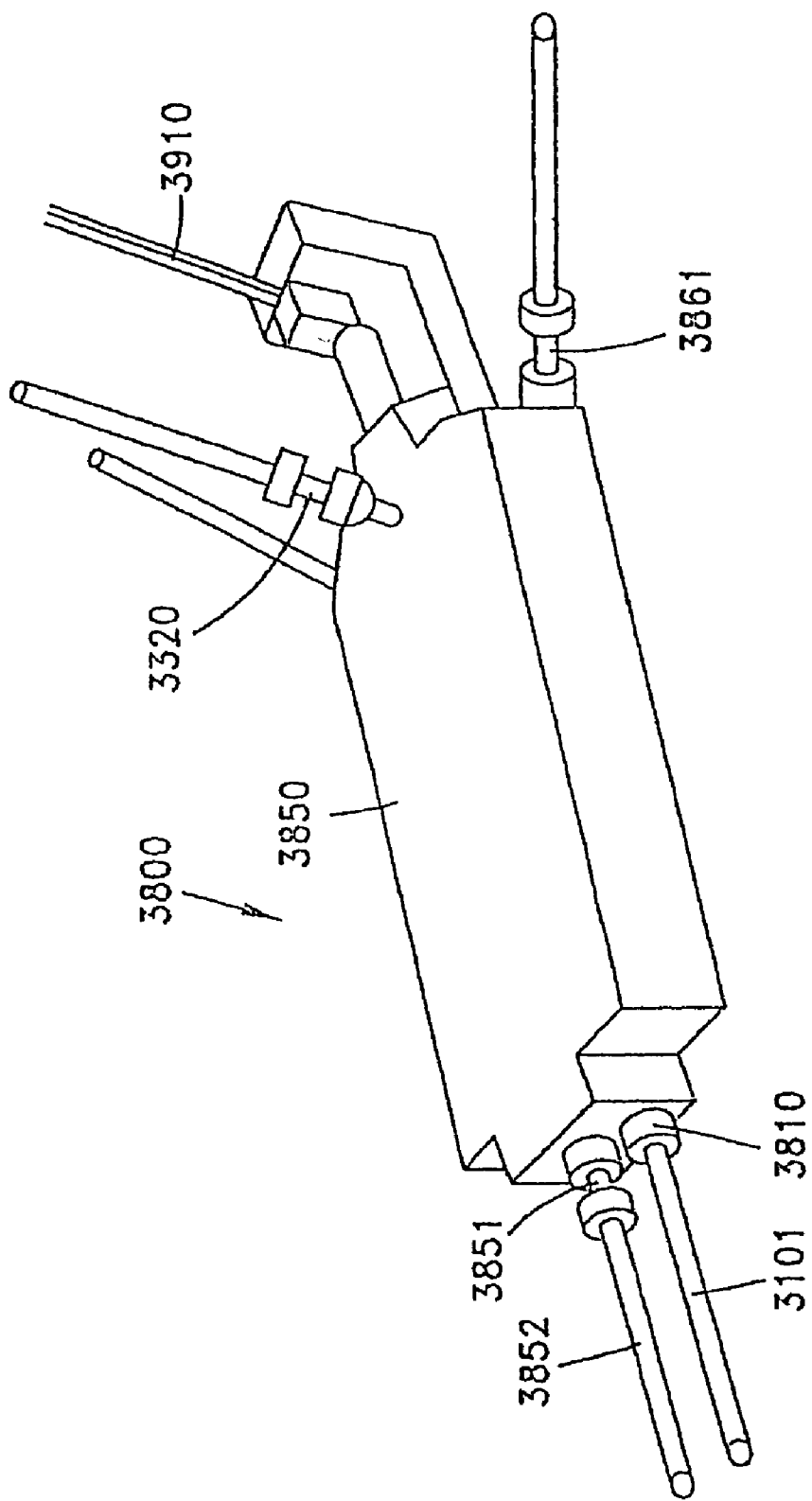
FIG. 13 illustrates the preheater of the system of FIG. 12.
Figure 14:
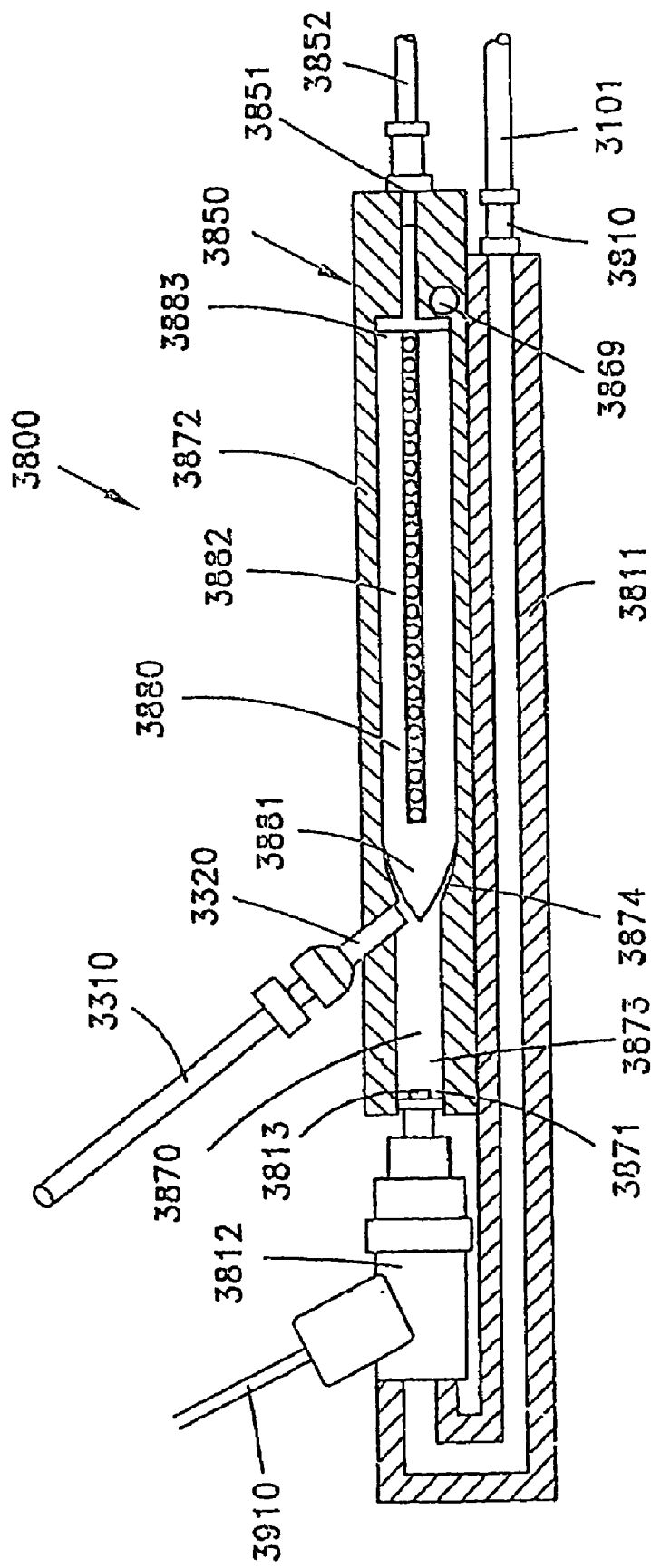
FIG. 14 illustrates in partial cross-sectional view the preheater of FIGS. 12 and 13.
Figure 17:
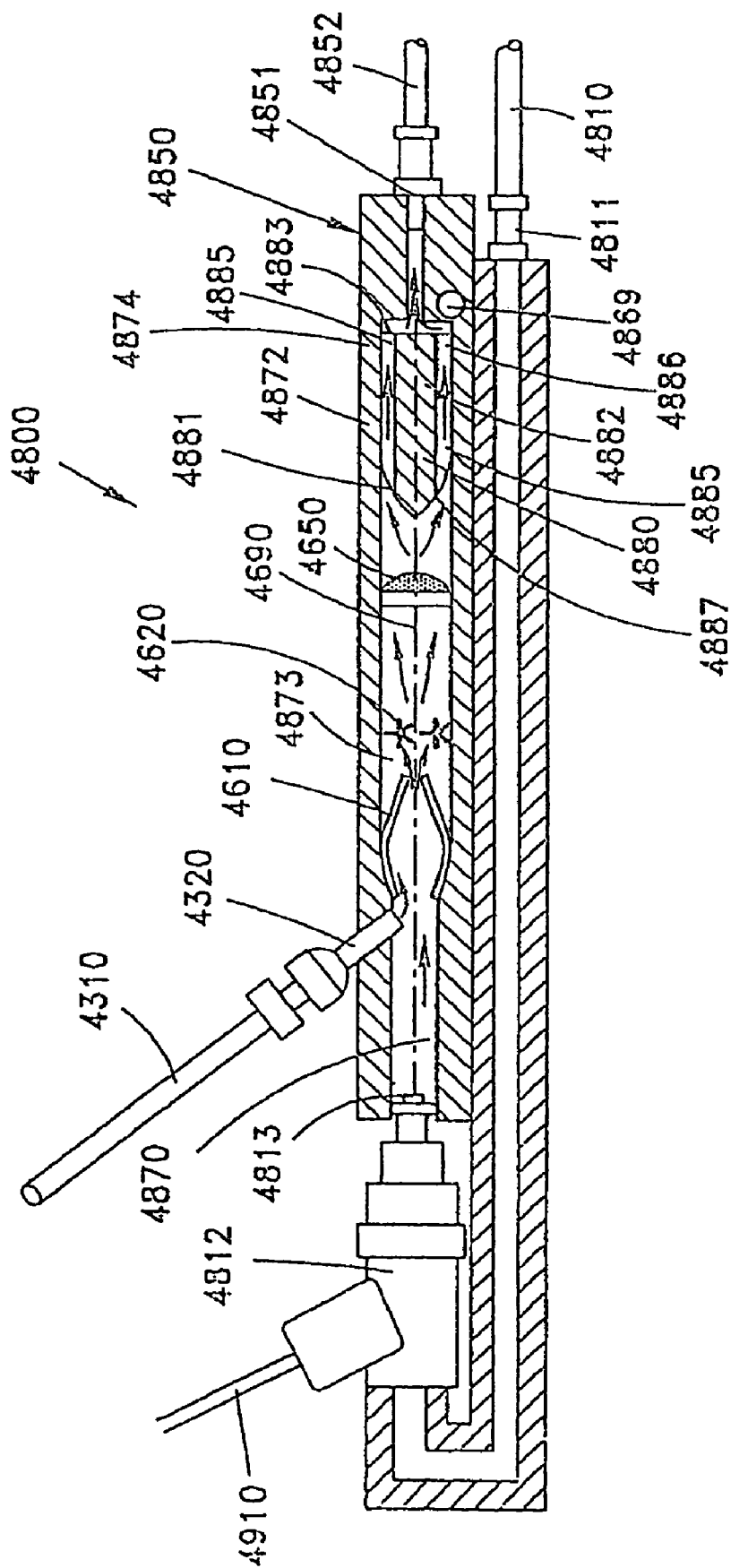
FIG. 17 illustrates in cross-sectional view a portion of the preheater according to a fifth embodiment of the present invention.

Referring to FIG. 12, in the fourth embodiment of the present invention, the operating system comprises a control system (3500) and a fuel system, (3100). The fuel system (3100) according to the fourth embodiment comprises a fuel tank (3010), operatively connected to the fuel injector means (3020) the engine (3000) via one or more primary fuel lines or conduits (3015). The fuel injection means (3020) preferably comprises individual fuel injectors for each cylinder of the engine. Typically, the fuel injector means (3020) provides fuel to the air intake system or directly to the cylinders, which is typically at a pressure of about −0.6 to 0 bar gauge pressure for "atmospheric" engines, and −0.6 to 1.5 bar gauge pressure for turbocharged engines.

In the fourth embodiment, a part of the fuel flow, and a part of the air flow to the engine (3000) are diverted to a special air-fuel pre-heater (3800), in which the fuel is mixed with air and preheated to the said predetermined temperature, and subsequently injected into the combustion system and thence to the cylinders, and typically no fuel remains to be returned to the tank (3010), as will be further described herein.

As with the first, second and third embodiments significant improvements in performance begin to become significant at fuel temperatures of around 60° C., depending on the type of fuel. Optimum fuel temperatures may be around 70° C. to 85° C., and increasing fuel temperatures beyond this typically have little effect on performance.

Thus, referring to FIG. 12, the fuel system (3100) comprises a secondary conduit (3101) branching off from the primary fuel conduit (3015), connecting the fuel system (3100) to a fuel inlet port (3810) of the preheater (3800).

Preferably, the fuel system (3100) further comprises a return conduit (3019) operatively connecting the downstream end of the injectors (3020) to the tank (3010) via a valve (not shown). The return conduit (3019) enables excess fuel to be returned to the tank (3010).

A bypass conduit (3016) is provided between the primary fuel conduit (3015) and the return conduit (3019), and comprises a pressure valve (3017) and tap (3014), the tap being opened only when low pressure is required as will be explained further herein. A suitable pump and control system (not shown), operatively connected to the primary fuel conduit (3015), pressurizes the fuel to a pressure of about 2 to 3 bar gauge pressure, albeit at low fuel flow rates required, and the bypass conduit reduces the gauge pressure to about 1.8 to 1.9 bar. The fuel pressure is lowered with respect to the datum engine (i.e., an engine not having the operating system of the present invention) to compensate for the addition of an additional fuel injector (in the preheater (3800)). The additional fuel injector would normally result in more fuel being provided at the same pressure, decreasing the excess air ratio.

Referring particularly to FIGS. 13 to 16, the preheater (3800) comprises a substantially solid housing (3850), comprising a mixing chamber (3870) and suitable heating means. The heating means are typically in the form of a heat exchanger arrangement, having a water inlet port (3861) connected to a water outlet port (3862) via suitable conduits (3863) or channels within the housing. Thus, the engine cooling system (300) comprises a secondary circuit having a conduit (301) which branches off from the hotter part of the cooling system and is connected to a water inlet port (3861) in said preheater (3800), and a second conduit (302) which branches off from the cooler part of the cooling system and connects to the water outlet port (3862) in said preheater (3800). Hot water, heated in the engine cooling system, passes through the housing (3850) via the heat exchanger arrangement, thereby heating the housing and the fuel and air that is input thereto, as will become clearer hereinbelow. A thermostat (not shown) is provided to maintain the temperature of the housing, and particularly the fuel therein, within predetermined limits, according to the invention. Alternatively, the thermostat may be used for operating the engine according to the present invention when the appropriate temperature has been reached in the preheater; while the temperature is below the required temperature, the engine is operated in the normal manner, that is at prior art values of λ, approximately 1 at steady state conditions, for example. The housing (3850) is typically made from a thermally conductive material, such as for example solid aluminium or any other suitable metal, and thus easily conducts heat from the heating system to the chamber (3870). Alternatively, the housing may be substantially hollow having an inner casing defining the said chamber (3870), in which case any suitable liquid, solid, gaseous or other heat transfer medium is provided in the volume between the housing and the casing.

A conduit (3811) connects the fuel inlet port (3810) with a fuel injector (3812) having a fuel dispensing outlet (3813) that dispenses metered quantities of fuel into the upstream end of chamber (3870), according to commands received from the controller (3900) that is operatively connected thereto via suitable leads (3910).

A conduit (3310) bleeds some air from the air intake system (165) of the engine to an air inlet port (3320) comprised in the housing (3850) that introduces this air bleed into the upstream end of the chamber (3870).

The chamber (3870) comprises a mixing plenum (3873) at an upstream end (3871) thereof, and a heating portion (3874) at a downstream end (3872) thereof. At least the heating portion (3874) is typically cylindrical, and the longitudinal length of the chamber (3870) is preferably substantially larger than the diameter of the heating portion (3874). The heating portion (3874) is adapted for enhancing mixing of the air and fuel that is introduced into the plenum (3871), and for maximizing the heat transfer from the housing (3850) to the fuel/air mixture. Preferably, the heating portion (3874) comprises a substantially cylindrical core portion (3880) having a streamlined upstream portion (3881), a body portion (3882) and a substantially blunt downstream end (3883). A number of longitudinal channels (3885) (in the present embodiment, four, but may be greater or less than four) are formed on the cylindrical surface of the body portion (3882), having an open downstream end (3886) each channel (3885) being superposed over a corresponding conduit (3884) formed in the core portion (3880) having an opening (3887) at an upstream end thereof, and in fluid communication with the corresponding channel (3885) via a plurality of apertures (3889) arranged along the length of the channel (3885). The external diameter of the body portion (3882) is just smaller than the inner diameter of the heating portion (3874) such as to provide a close fit between the two components.

Thus, air from the bleed conduit (3310) and fuel from the injector (3812) are introduced into the plenum (3873). The air and fuel then enter the conduits (3884) via openings (3887), and through the apertures (3889) to the corresponding channels (3885), and in doing so become mixed. At the same time, the relatively small width or diametrical dimension of the conduits (3884) and channels (3885) together with the relatively long passages to the end (3886) ensures that a great deal of heat transfer takes place between the housing (3850) and core portion (3880), and the fuel air mixture passing therethrough in an efficient manner. Thereafter, the suitably heated air-fuel mixture is fed to the combustion system of the engine, together with the rest of the air and fuel that is provided by the air intake system and the fuel injectors, respectively, via outlet (3851) and conduit (3852).

The activity of the fuel injectors (3020) of the fuel system (3100) is regulated by the regular engine management system or computer (3120). Typically, for a regular engine of the art, the computer (3120) controls how much fuel to provide to the combustion system via the injectors (3020) for a range or conditions of the engine, sensed via any number of different sensors, such as for example an oxygen sensor (3122). Such an oxygen sensor (3122) is commonly used in the art for enabling the amount of oxygen being provided to the engine to be determined, in real-time, and in fact typically senses the level of oxygen in the exhaust gases. For example, if the sensor determines that there is too much oxygen in the exhaust gases, it means that more fuel is required. Thus, on the basis of the excess air ratio appropriate to the speed and load on the engine, the input from the oxygen sensor enables the computer to determine the fuel required to be provided to the combustion chamber. Thus, in normal steady state conditions, the amount of fuel provided is such that the excess air ratio is about unity (under steady state conditions), and the fuel/air ratio is approximately the stoichiometric ratio. Under acceleration or large loads, the excess air ratio is lowered by adding more fuel, and when idling the excess air ratio is increased but typically does not exceed 1.

In addition, the operating system according to the fourth embodiment also comprises a controller (3900), the function of which is to control the excess air ratio at which the engine operates, according to the present invention, which, as in other embodiments of the invention, is substantially greater than for a corresponding engine without the operating system of the present invention. The controller (3900) may thus be part of, and thus incorporated into, the engine computer (3120), in terms or software and/or hardware. Alternatively, the controller (3900) is separate from the computer (3120), and may comprise a separate computer or other electronic control means, and is thus retrofittable, together with the preheater (3800), onto existing vehicles as a retrofit kit. In such a case, the controller (3900) is operatively connected to the computer (3120) and the fuel injector (3812) of the preheater (3800), and of course to a suitable power source, and where appropriate, also to a supercharger or turbocharger.

The controller (3900) on the one hand interrogates the computer (3120) to determine the current running condition of the engine—for example, whether it is accelerating, idling, cruising, and so on. Then, based on the computer's determination of the excess air factor required for this condition, the controller (3900) works out the appropriate excess air ratio according to the present invention, which is substantially higher than that determined by the computer (3120), typically about 1.3.

Alternatively, one or more sensors, such as the oxygen sensor (3122) is connected to the controller (3900) rather than to the computer (3120). The controller (3900) then works out the amount of fuel required by the engine for the appropriate excess air ratio according to the present invention, which is substantially higher than that of a prior art engine, typically about 1.3, according to the operating state, i.e., speed and load of the engine, and the amount of air or oxygen being provided to the engine. In this connection, the bypass conduit (3016), including valve (3017) and tap (3014), reduce the fuel pressure to about 1.8 bar or 1.9 bar gauge pressure, and thus enable the fuel flow to be reduced to the fuel injectors.

The controller (3900) then sends an appropriate signal to the computer (3120) to reduce the amount of fuel that is injected by the injectors (3020) by an appropriate amount such as to provide the required higher value of excess air ratio.

The controller (3900) then sends another signal to the computer (3900) such as to confirm that the fuel air ratio is nevertheless correct. Without this latter signal, the computer (3120) would sense that the air fuel ratio is too low (because of the much higher excess air ratio), and increase the same to stoichiometric proportions or whatever proportions would normally be required by the engine (that is, in the absence of the operating system of the present invention). In practice, the sensors that would normally provide the necessary inputs to the computer (3120) such to enable this to calculate the required excess air ratio would be connected instead to the controller (3900). In turn, the controller (3900) provides appropriate signals to the computer (3120) that mimic the signals that the computer would have received from these sensors if the engine were being run at regular excess air ratios. The computer (3120) would thus operate as if the engine were being operated at regular excess air ratios.

Further, the controller (3900) also controls the activity of the fuel injector (3812) of the preheater (3800), and thus provides the appropriate signals to the injector (3812) according to the conditions of the engine. Since part of the fuel to the engine is being provided via the injector (3812), the fuel provided by the injectors (3020) is actually reduced further, so that the effective operating excess air factor, that is, in terms of the fuel provided to the injectors (3020) and the air flow provided by the air intake system, is substantially less than 1.4, typically about 1.287, for steady state cruising conditions.

The excess air ratio at other conditions is adjusted in a similar manner, mutatis mutandis. Where the engine is fitted with a supercharger or turbocharger, the airflow may also be controlled together with the fuel input to provide the required excess air ratios, by means of the controller (3900).

Optionally, the controller (3900) may be further adapted to enable the engine to operate at regular excess air ratios under certain conditions. For example, when accelerating, it may be advantageous to operate the engine at the regular or datum excess air ratio rather than at a higher excess air ratio according to the present invention. In such a case, the controller (3900) closes the tap (3014) and also the supply of fuel to the preheater fuel injector (3812), and then sends an appropriate signal to the engine computer (3120) such that as to provide the appropriate fuel to the fuel injectors (3020). In the retrofit according to the first, second and third embodiments described above, a similar controller to controller (3900) may be used, mutatis mutandis, such that interacts with the engine management system or regular computer of the engine, and thus minimize modifications to the operation thereof.

Optionally, the fourth embodiment also preferably comprises an additive atomizing system (not shown) similar to that described with respect to the first embodiment, mutatis mutandis, including a refillable reservoir for holding a suitable volume of a suitable medium and for supplying the same to a suitable additive atomizing unit via a line or conduit, and a suitable collar for providing the atomized medium to the air intake system of the engine. Alternatively the medium may be directly injected into the combustion chamber (122) via an appropriate injector in communication with the medium reservoir, even without aerating the medium. Alternatively, the atomized medium may be fed directly to the plenum (3873) of the preheater (3800) via suitable ducting.

Thus, the fourth embodiment is readily retrofittable to a regular engine, as follows, for example. The main fuel line (3015) is modified, by connecting a T-junction, such as to provide a secondary conduit that is connected to the fuel inlet port (3810) of the preheater (3800). A bypass conduit (3016) is provided between the primary fuel conduit (3015) and the return conduit (3019), and comprises a pressure valve (3017) and tap (3014). Similarly, the cooling system of the engine, in particular the water conduits leading into and out of the radiator are similarly modified to bleed off a proportion of the hot water to the preheater (3800) via the ports (3861) and (3862). An air bleed is then provided from the air intake system to the preheater (3800) via the air inlet port (3320). Then, the controller (3900) is connected to the preheater (3800) and the vehicle computer (3120), and of course to a suitable electrical power source.

Referring to FIGS. 17 to 20, in the fifth embodiment of the present invention, the operating system comprises a control system and a fuel system substantially as hereinbefore described with respect to the fourth embodiment, mutatis mutandis, with the following differences with respect to the preheater.

As in the fourth embodiment, in the fifth embodiment, a part of the fuel flow, and a part of the air flow to the engine are diverted to a special air-fuel pre-heater (4800), in which the fuel is mixed with air and preheated to the said predetermined temperature, and subsequently injected into the combustion system and thence to the cylinders, and typically no fuel remains to be returned to the tank, as described with respect to the fourth embodiment, mutatis mutandis. In common with the fourth embodiment, the preheater is in communication with the combustion system of the engine, and thus the preheater is at substantially the same pressure as the combustion system. Thus, the preheater heats a portion of fuel (and also some air) to a predetermined temperature prior to delivery of said portion of fuel into the combustion system of the engine. While this predetermined temperature is below the vaporization temperature of the fuel at the delivery fuel pressure, it is nevertheless sufficient such as to enable this portion of fuel to substantially vaporize at the ambient pressure of said combustion system, which exists in the preheater.

As with the other embodiments described herein, significant improvements in performance begin to become significant at fuel temperatures of around 60° C., depending on the type of fuel. Optimum fuel temperatures may be around 70° C. to 85° C., and increasing fuel temperatures beyond this typically have little effect on performance.

As with the fourth embodiment, a secondary fuel conduit branches off from the primary fuel conduit, connecting the fuel system to a fuel inlet port (4810) of the preheater (4800), and preferably, the fuel system further comprises a return conduit operatively connecting the downstream end of the engine fuel injectors to the tank via a valve. The return conduit enables excess fuel to be returned to the tank. A bypass conduit is provided between the primary fuel conduit and the return conduit, and comprises a pressure valve and tap, the tap being opened only when low pressure is required as has been described herewith with respect to the fourth embodiment, mutatis mutandis.

A suitable pump and control system, operatively connected to the primary fuel conduit, pressurizes the fuel to a pressure of about 2 to 3 bar gauge pressure, albeit at low fuel flow rates required, and the bypass conduit reduces the gauge pressure to about 1.8 to 1.9 bar. The fuel pressure is lowered with respect to the datum engine (i.e., an engine not having the operating system of the present invention) to compensate for the addition of an additional fuel injector (in the preheater (4800)). The additional fuel injector would normally result in more fuel being provided at the same pressure, decreasing the excess air ratio.

Referring particularly to FIGS. 17 to 20, the preheater (4800) comprises a substantially solid housing (4850), comprising a mixing chamber (4870) and suitable heating means. The heating means are typically in the form of a heat exchanger arrangement, having a water inlet port connected to a water outlet port via suitable conduits (4869) or channels within the housing. Thus, the engine cooling system comprises a secondary circuit having a conduit which branches off from the hotter part of the cooling system and is connected to a water inlet port in said preheater (4800), and a second conduit which branches off from the cooler part of the cooling system and connects to the water outlet port in said preheater (4800). Hot water, heated in the engine cooling system, passes through the housing (4850) via the heat exchanger arrangement, thereby heating the housing and the fuel and air that is input thereto, as will become clearer hereinbelow. A thermostat (not shown) is provided to maintain the temperature of the housing, and particularly the fuel therein, within predetermined limits, according to the invention. Alternatively, the thermostat may be used for operating the engine according to the present invention when the appropriate temperature has been reached in the preheater; while the temperature is below the required temperature, the engine is operated in the normal manner, that is at prior art values of λ, approximately 1 at steady state conditions, for example. The housing (4850) is typically made from a thermally conductive material, such as for example solid aluminium or any other suitable metal, and thus easily conducts heat from the heating system to the chamber (4870). Alternatively, the housing may be substantially hollow having an inner casing defining the said chamber (4870), in which case any suitable liquid, solid, gaseous or other heat transfer medium is provided in the volume between the housing and the casing.

A conduit (4811) connects the fuel inlet port (4810) with a fuel injector (4812) having a fuel dispensing outlet (4813) that dispenses metered quantities of fuel into the upstream end of chamber (4870), according to commands received from the controller that is operatively connected thereto via suitable leads (4910).

A conduit (4310) bleeds some air from the air intake system (165) of the engine to an air inlet port (4320) comprised in the housing (4850), and introduces this air bleed into the upstream end of the chamber (4870). In the fifth embodiment, the air conduit (4310) is larger than that of the fourth embodiment, enabling relatively more air to be introduced into the preheater (4800).

The chamber (4870) comprises a mixing and gasification zone (4873) just downstream of the air inlet port (4320) and of the fuel injector outlet (4813), and a supplementary heating portion (4874) at a downstream end (4872) of the chamber (4870). The heating portion (4874) is typically cylindrical, while the zone (4873) is typically of rectangular section, and the longitudinal length of the chamber (4870) is preferably substantially larger than the diameter of the heating portion (4874).

The main differences between the fourth and fifth embodiments lie in the zone (4873). In the fifth embodiment, the zone (4873) comprises at least one, and preferably two paddle-type rotors (4620), a nozzle (4610) upstream thereto, and a double net diaphragm or screen arrangement (4650) downstream thereto.

The nozzle (4610) is substantially aligned with the longitudinal axis (4690) of the chamber (4870), having an exit which may be circular or substantially rectangular, having it longer side orthogonal to the axis. The nozzle (4610) accelerates the air and fuel provided to the upstream end of the chamber (4870) and directs this mixture towards the rotors (4620).

Figure 18:
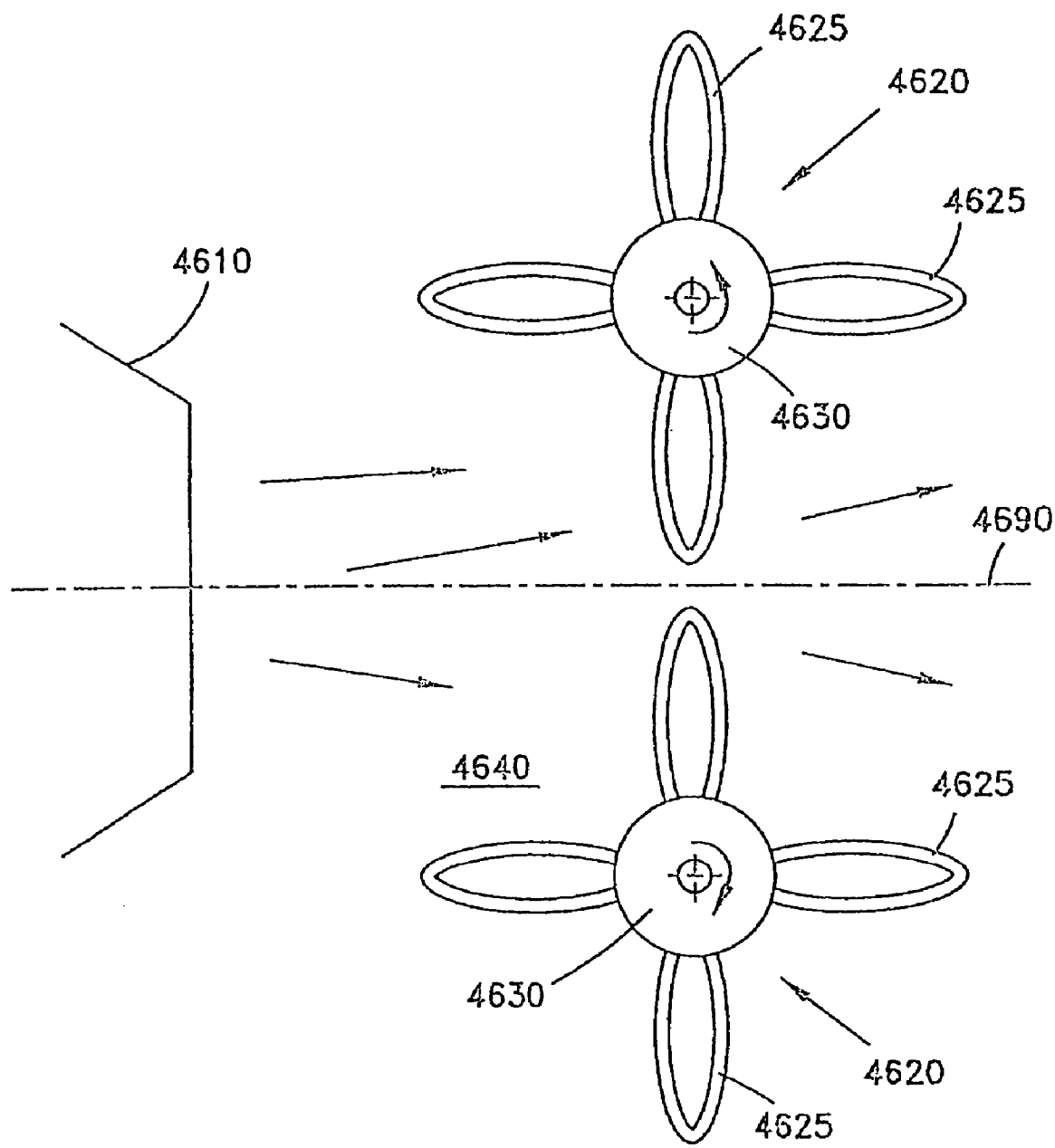
FIG. 18 illustrates in detail the rotor arrangement of the embodiment of FIG. 17.
Figure 19A:
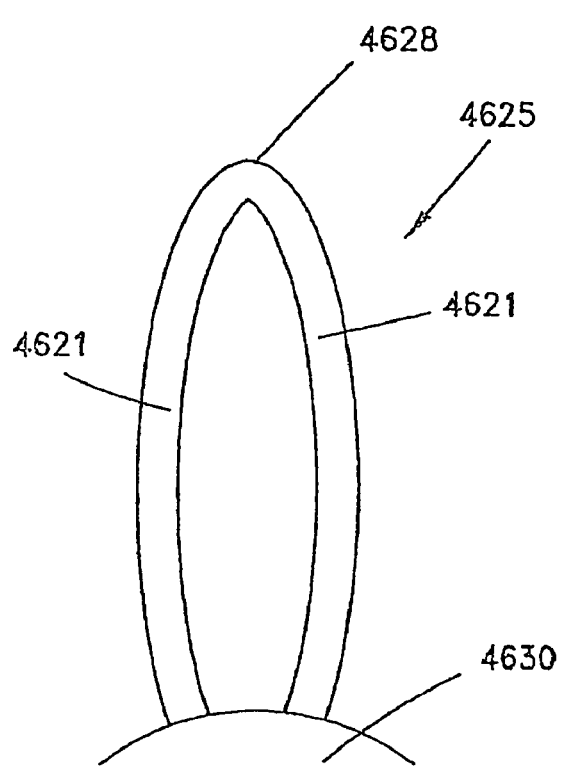
FIGS. 19($a$) and 19($b$) illustrates in partial cross-section view the effect of centrifugal forces on a blade of the rotors of the embodiment of FIG. 18.
Figure 19B:
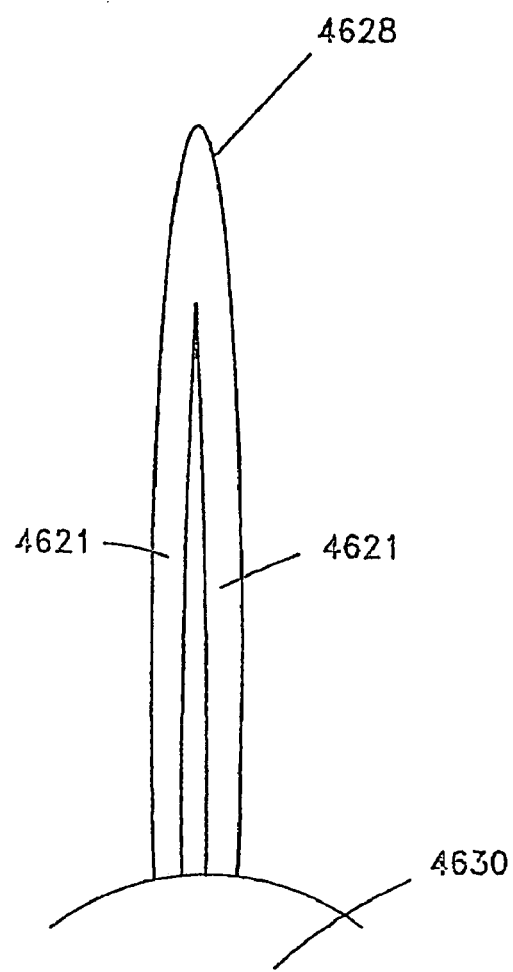

Referring particularly to FIG. 18, each rotor (4620) is mounted for rotation orthogonal to the longitudinal axis (4690) of the preheater (4900), and comprises a plurality of vanes (4625). The rotors (4620) are mounted with their axis in parallel as illustrated in FIG. 18, such that the air fuel mixture from the nozzle (4610) is directed to an area (4640) between the rotors (4620), causing the rotors (4620) to counter-rotate. Referring to FIGS. 19(*a*) and 19(*b*) in particular, each vane (4625) comprises a pair of outwardly bulging walls (4621) joined at their roots to the hub (4630) of the rotor (4620), and joined together at the tips (4628). The walls (4621) are made of a thin mesh material, which deflects under centrifugal force such that the two walls (4621) in each vane (4625) come together, and the meshes substantially overlap, though typically not substantially in phase, that is, that not all of the open spaces in one mesh are superposed over the open spaces in the other mesh, and thus, the effective open area of the two meshes is reduced. Thus, when the flow through the nozzle is relatively slow, the rotors (4620) rotate at a relatively low speed, and droplets of fuel flowing therethrough have to pass through both walls of each vane, enhancing the ability of the vanes to atomise the fuel, and with the heat input provided by the heating means, to also gasify the fuel. At higher flows, where the rotors are caused to rotate faster and thus bring the walls of the vanes together, the fuel droplets impinge on the vanes with greater force, and the relatively smaller openings now available in the superposed meshes helps to atomise and gasify the fuel.

Figure 20:
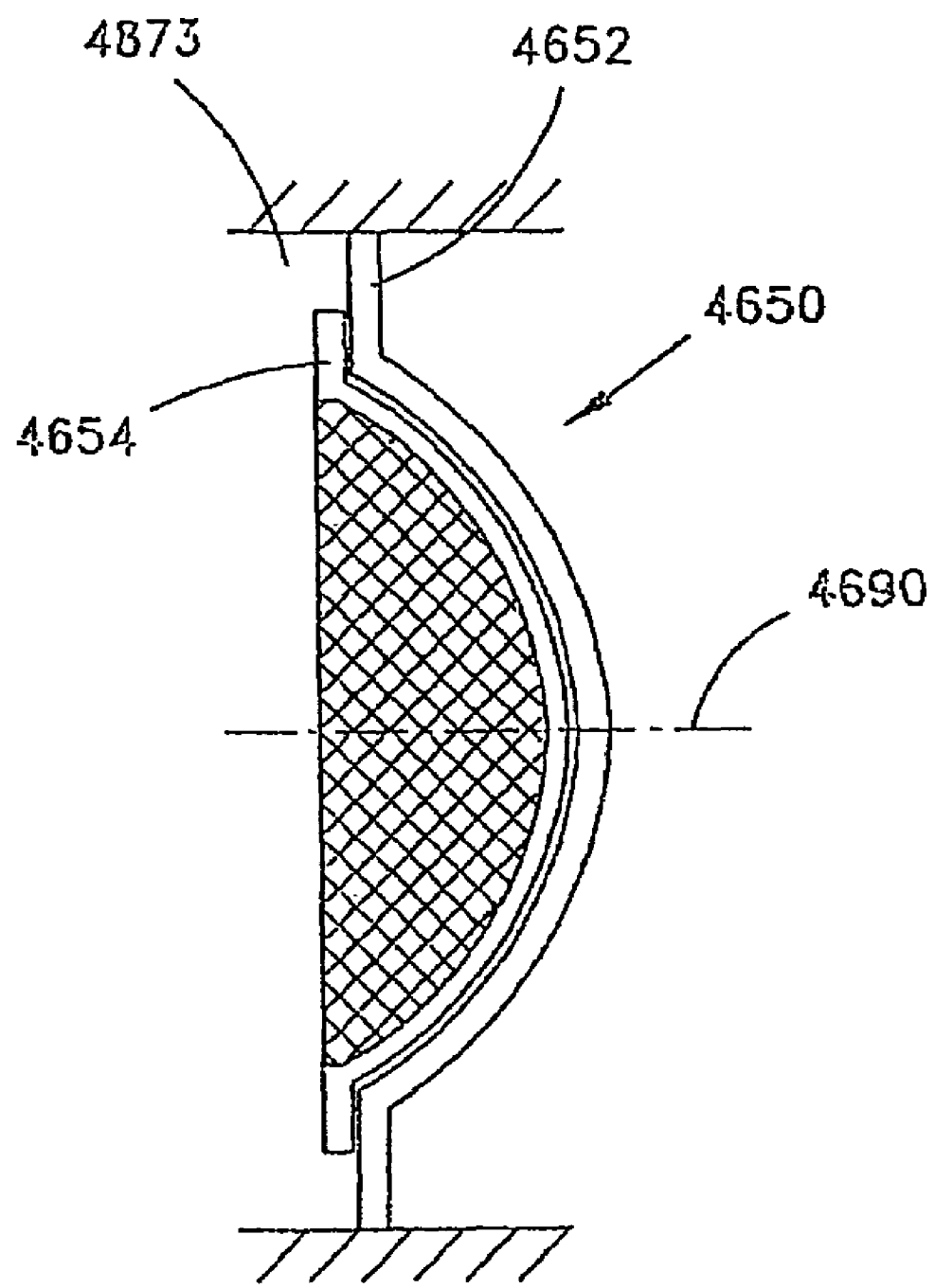
FIG. 20 illustrates in detail the screen arrangement of the embodiment of FIG. 17.

The screen arrangement (4650) is provided downstream to the rotors (4620), and only allows gasified fuel, together with air, to pass therethrough and towards the heating portion (4874). Referring to FIG. 20 in particular, the screen arrangement comprises at least one mesh and preferably a pair of meshes, comprising a base mesh (4652) mounted substantially orthogonally to the axis (4690) in the zone (4873), and a secondary mesh (4654) mounted for rotation with respect to the base mesh (4652) about an axis substantially parallel or coaxial with the axis (4690) of the zone (4873). The base mesh (4652) is substantially hemispherical, or other suitable shape, being convex in the downstream direction, and accommodating the secondary mesh (4654), which is also substantially hemispherical or has a complementary shape to the base mesh (4652), in the concavity thereof. As the secondary mesh (4654) is rotated with respect to the base mesh in one direction about its axis of rotation, some nodes of one mesh cover the open spaces of the other mesh, and vice versa, effectively reducing the effective open area of the screen arrangement (4650). As the secondary mesh is rotated in the opposite direction, the effective open area is again increased.

Thus the double mesh or net arrangement (4650) enables the open net area to be closed or open, according to the relative position of the open and closed areas of each of the meshes or nets. When there is a need to accelerate, for example, the sudden increase in fuel in the preheater (4800) reduces the vacuum, i.e., increases the air pressure there, and thus reduced the flow to the cylinders. Accordingly, the net arrangement (4650) is opened to increase the airflow to the engine. When the engine rpm is increased and the pressure difference is again restored between the preheater (4800) and the engine, the net arrangement (4650) closes again to provide the original flow area. A suitable mechanism is provided for actuating the net arrangement to open the effective flow area at a certain pressure, and to close when the pressure drops. Such a mechanism is preferably adjustable externally from the preheater (4800) such as to set the pressure difference value at which the net arrangement (4800) opens to the full effective open area.

The net arrangement (4650) prevents droplets of fuel from passing through, though any atomized or vaporized fuel mixed with air can pass through. When the required acceleration is achieved, and the pressure difference increases again, the net arrangement (4650) moves back to its original position, and the effective flow area decreases again. In this embodiment the air inlet conduit (4310) is bigger relative to that of the fourth embodiment, to enable a faster response time to acceleration demand.

The heating portion (4874) is adapted for providing additional heating to the mixture of air and fuel prior to exiting the preheater (4800), maximizing the heat transfer from the housing (4850) to the fuel/air mixture. Preferably, the heating portion (4874) comprises a substantially bullet-shaped core portion (4880) having a streamlined upstream portion (4881), a body portion (4882) and a substantially blunt downstream end (4883). The body portion may be substantially shorter than that of the fourth embodiment. A number of longitudinal channels (4885) (in the present embodiment, four, but may be greater or less than four) are formed on the surface of the body portion (4882), having an open downstream end (4886) and an opening (4887) at an upstream end thereof. The external diameter of the body portion (4882) is just smaller than the inner diameter of the heating portion (4874) such as to provide a close fit between the two components.

Thus, air from the bleed conduit (4310) and fuel from the injector (4812) are introduced into the zone (4873) via the nozzle (4610). The fuel is then atomized and vaporized by virtue of the rotors (4620) and the heat input, and mixed with air. The air and vaporized fuel mixture then passes through the net arrangement (4650) to the heating portion (4874); any fuel that has still not vaporized is circulated back into the zone (4873) and eventually becomes vaporized. The air fuel mixture then enters the channels (4885) via openings (4887), and heat transfer takes place between the housing (4850) and core portion (4880), and the fuel air mixture passing therethrough, in an efficient manner. The zone (4873) is at substantially the same pressure as the combustion system of the engine, and the heat transfer to the fuel in the preheater (4800) is such as to heat the fuel to the vaporization temperature at this pressure. (Of course, this temperature is too low to vaporize the fuel at the delivery fuel pressure itself.) Thereafter, the suitably heated air-fuel mixture is fed to the combustion system of the engine, via conduit (4852), together with the rest of the air and fuel that is provided by the air intake system and the fuel injectors, respectively, via outlet (4851) and conduit (4852).

The activity of the fuel injectors of the original fuel system of the engine is regulated by the regular engine management system or computer in a similar manner to that described for the fourth embodiment, mutatis mutandis.

Thus, the fifth embodiment is readily retrofittable to a regular engine, as follows, for example. The main fuel line of the fuel system is modified, by connecting a T-junction, such as to provide a secondary conduit that is connected to the fuel inlet port (4810) of the preheater (4800). A bypass conduit is provided between the primary fuel conduit and the return conduit, and comprises a pressure valve and tap. Similarly, the cooling system of the engine, in particular the water conduits leading into and out of the radiator are similarly modified to bleed off a proportion of the hot water to the preheater (4800) via the water ports. An air bleed is then provided from the air intake system to the preheater (4800) via the air inlet port (4320). Then, the controller (3900) is connected to the preheater (4800) and to the vehicle computer (3120) and sensors, and of course to a suitable electrical power source, as with the fourth embodiment.

The present invention also relates to a method for operating an internal combustion engine, comprising:

heating at least a portion of fuel (optionally together with air) to a predetermined temperature prior to delivery of said portion of fuel into the combustion system of the engine, wherein said temperature is below the vaporization temperature of the fuel at the delivery fuel pressure, but is sufficient such as to enable said portion of fuel to substantially vaporize at the pressure of the combustion system.

The predetermined temperature is typically in the range of between about 60° C. and about 100° C., and preferably between 70° C. and about 85° C. The at least portion of fuel may be heated by means of a fuel system as defined herein.

The method preferably further comprises:—

(B) controlling an air fuel ratio to said engine such as to provide an excess air ratio substantially greater than a datum excess air ratio, wherein said datum excess air ratio is associated with at least one optimal running characteristic of a corresponding engine, wherein step (A) is not applied to said corresponding engine.

The said datum excess air ratio is typically between 0.96 and 1.04; the said target excess air ratio is substantially greater than about 1.05, preferably between about 1.05 and about 2.0, more preferably between about 1.1 and about 1.6, more preferably between about 1.15 and about 1.5, more preferably between about 1.2 and about 1.4, more preferably between about 1.25 and about 1.35, and more preferably about 1.287 or about 1.3. Preferably, said target air excess ratio is such as to provide at least one optimal running characteristic for said engine, which may include at least one of optimum fuel consumption and optimum torque for the engine. The datum excess air factor typically corresponds to a fuel-air ratio of about 14.7 to 1 by mass.

The target excess air ratio at any engine condition may be provided by delivering a lower fuel flow to said combustion system in relation to the corresponding fuel flow delivered in said corresponding engine in (B) when run at substantially the same engine condition. The said excess air ratio may be controlled by suitable control means operatively connected to a fuel injection means of the engine.

Alternatively or additionally, the target excess air ratio at any engine condition may be provided by delivering a higher air flow to said combustion system in relation to the corresponding air flow delivered in said corresponding engine in (B) when run at substantially the same engine condition. The higher air flow may be delivered by means of a turbocharger comprised in the air inlet system of the engine, and control of said excess air ratio is performed by suitable control means, including a suitable computer means, which may be comprised, for example, in the fuel injection control computer of the engine.

EXAMPLES

A standard VW Golf 2000 cc engine (year 2002) installed in the automobile was run at a testing facility at conditions listed in Table 1, for an engine power rating of 15 kW. Fuel consumption and exhaust gas composition was measured, and these results are listed in Table II. The engine was then modified to, include the operating system of the present invention according to the first embodiment described herein, and the test was then repeated at substantially similar conditions, with excess air ratio at about 1.26, and with the fuel being preheated as described herein, as listed in Table I. Fuel consumption and exhaust gas composition was also recorded, and are listed in Table II. Each standard test was run for nominally 292 seconds at a controlled load.

TABLE I

Running Conditions for Standard and Modified Engine
Engine Power at 15 kW (Without Catalytic Converter)

|  | Standard Engine (First Test) | Modified Engine (Second Test) |
| --- | --- | --- |
| Excess air ratio | 0.996 | 1.26 |
| Load (N) | 430 | 430 |
| RPM | 3535 | 3483 |
| Speed (kph) | 125.0 | 125.0 |
| Engine Power (KW) | 14.9 | 15.0 |
| Ambient Temp | 22.95° C. | 33.06° C. |
| Fuel in Temp | 22.37° C. | 32.21° C. |
| Fuel out Temp | 23.30° C. | 34.43° C. |
| Barometric Pressure(bar) | 1.026 | 1.014 |
| Fuel in Pressure(bar) | 2.58 | 2.41 |
| Fuel out Pressure(bar) | 0.17 | 0.18 |
| Exhaust Temp | 709° C. | 656.9° C. |

TABLE II

Results for Standard and Modified Engine
Engine Power at 15 kW (Without Catalytic Converter)

|  | Standard Engine (First Test) | Modified Engine (Second Test) |
|---|---|---|
| Fuel Consumption (grams per test cycle) | 0.617 | 0.517 |
| CO (% vol.) | 0.78 | 0.14 |
| HC (ppm vol.) | 86 | 57 |
| $CO_2$ (% vol.) | 14.5 | 11.7 |
| $O_2$ (% vol.) | 0.39 | 4.59 |
| $NO_x$ (ppm vol.) | 3194 | 2009 |

As can be readily seen, the effect of providing fuel preheating and increasing excess air ratio resulted in a reduction of more than 16% in fuel consumption, and substantial reduction in carbon monoxide, hydrocarbon, and NOx emission levels.

The tests were then repeated at the conditions listed in Table III, for an engine power rating of 25 kW, and fuel consumption and exhaust gas composition was measured, and these results are listed in Table IV. Again, each standard test was run for nominally 292 seconds at a controlled load.

TABLE III

Running Conditions for Standard and Modified Engine
Engine Power at 25 kW (Without Catalytic Converter)

|  | Standard Engine (First Test) | Modified Engine (Second Test) |
|---|---|---|
| Excess air ratio | 1.000 | 1.280 |
| Load (N) | 842 | 840 |
| RPM | 2996 | 3017 |
| Speed (kph) | 106 | 108 |
| Engine Power (KW) | 25 | 25.0 |
| Ambient Temp | ° C. | ° C. |
| Fuel in Temp | 27.69° C. | 82.44° C. |
| Fuel out Temp | 27.69° C. | 35.8° C. |
| Barometric Pressure(bar) | 1.024 | 1.013 |
| Fuel in Pressure(bar) | 2.77 | 2.87 |
| Fuel out Pressure(bar) | 0.14 | 0.15 |
| Exhaust Temp | 732.5° C. | 688.7° C. |

TABLE IV

Results for Standard and Modified Engine
Engine Power at 25 kW (Without Catalytic Converter)

|  | Standard Engine (First Test) | Modified Engine (Second Test) |
|---|---|---|
| Fuel Consumption (grams per test cycle) | 0.696 | 0.593 |
| CO (% vol.) | 0.75 | 0.12 |
| HC (ppm vol.) | 83 | 54 |
| $CO_2$ (% vol.) | 14.4 | 11.6 |
| $O_2$ (% vol.) | 0.43 | 4.81 |
| $NO_x$ (ppm vol.) | 3166 | 1433 |

As can be readily seen, the effect of providing fuel preheating and increasing excess air ratio resulted in a reduction of more than 14% in fuel consumption, and substantial reduction in carbon monoxide, hydrocarbon and NOx emission levels.

Another series of comparative tests were then conducted on the same engine, first the unmodified regular engine, and then comprising the operating system according to the fourth embodiment.

TABLE V

Running Conditions for Standard and Modified Engine
Engine Power at 15 kW and at 25 kW (Without Catalytic Converter)

| Excess Air Ratio | 15 kW Standard | 15 kW Modified | 25 kW Standard | 25 kW Modified |
|---|---|---|---|---|
| Load(N) | 606 | 606 | 430 | 430 |
| Rpm | 2529 | 2560 | 3535 | 3514 |
| Speed (kph) | 90 | 92 | 125 | 125 |
| Engine power (kW) | 15 | 15 | 25 | 25 |
| Ambient temp (° C.) | 43.37 | 33.31 | 55.73 | 33.6 |
| Fuel in temp | 25.2 | 33.8 | 27.89 | 32.38 |
| Fuel out temp | 25.89 | 35.9 | 28.62 | 33.6 |
| Barometric pressure (bar) | 1.022 | 1.014 | 1.022 | 1.014 |
| Fuel in pressure (bar) | 2.67 | 2.62 | 2.56 | 2.45 |
| Exhaust temp (° C.) | 643.9 | 625.6 | 714 | 662 |
| Fuel Consumption (grams per test cycle) | 490 | 413 | 625 | 536 |
| $CO_2$ (% vol.) | 0.80 | 0.12 | 0.77 | 0.18 |
| HC(ppm) | 101 | 65 | 83 | 57 |
| $CO_2$ (% vol) | 14.4 | 11.8 | 14.5 | 11.8 |
| $O_2$ (% vol) | 0.46 | 4.68 | 0.41 | 4.47 |
| $NO_x$ (ppm vol) | 2879 | 1267 | 3231 | 2069 |

As can be readily seen, the effect of providing fuel preheating and increasing excess air ratio resulted in a reduction of about 14% to 16% in fuel consumption, and substantial reduction in carbon monoxide, hydrocarbon and NOx emission levels.

While these tests were conducted with open loop control, better comparative results may be obtained when running the engine, before and after modifications according to the present invention, using closed loop control to better match actual operating conditions.

The operating system of the present invention may be used with internal combustion engines comprising fuel injection systems of all types, with or without supercharging or turbocharging.

Similarly, the operating system of the present invention may be applied to Diesel engines in a similar manner to that described herein, mutatis mutandis. In particular, Diesel engines incorporating common rail injection systems may be modified in a similar manner to that described with respect to the first, second, third and fourth embodiments as described herein, mutatis mutandis, but the fuel is typically heated to a greater temperature, typically from about 200° C. to about 300° C., for example.

While in the foregoing description describes in detail only a few specific embodiments of the invention, it will be understood by those skilled in the art that the invention is not limited thereto and that other variations in form and details may be possible without departing from the scope and spirit of the invention herein disclosed.

What is claimed is:

1. An operating system for an internal combustion engine, which provides reduced energy consumption and reduced air pollution, said operating system comprising:
    (a) a fuel system including heating means for heating at least a portion of fuel, while flowing to fuel injection means, to reach a temperature between 60° C. and about 95° C. prior to injection of said portion of fuel into a combustion system of the engine, wherein said temperature is below a vaporization temperature of the fuel at a delivery fuel pressure, but is above a vaporization temperature of the fuel at a pressure of said combustion system, said fuel system comprising:

(i) a primary fuel circuit comprising a fuel tank operatively connected to a pressure valve via an upstream primary conduit and a downstream primary return conduit;

(ii) a secondary fuel circuit comprising fuel injection means in selective communication with the combustion system of the engine, said injection means being operatively connected to said primary conduit via an upstream secondary conduit; and (iii) suitable fuel heating means for heating the fuel in said secondary fuel circuit, said suitable heating means comprises suitable temperature sensing means for sensing fuel temperature therein, said temperature sensing means being operatively connected to a suitable controller, and wherein said controller is operatively connected to a valve in a secondary return conduit;

(b) an air intake system receiving air at ambient temperature and receiving the heated fuel, said air intake system vaporizing the heated fuel to cool the air and thereby increasing an air mass flow being delivered into said combustion system; and (c) control means for enforcing an essentially constant target air-to-fuel ratio in said engine, said target air fuel ratio being selected in the range of Lambda between 1.25 to 1.35, said control means including a controller, said controller being connected to an engine computer and engine sensors, calculating said target air-to-fuel ratio, and sending an appropriate signal to said engine computer to alter the portion of fuel injected by said fuel injector means accordingly.

2. An operating system as claimed in claim 1, wherein said controller is adapted for opening said valve and diverting fuel flow from said heating means when said fuel temperature sensed by said temperature sensing means exceeds a predetermined limit.

3. An operating system for an internal combustion engine, which provides reduced energy consumption and reduced air pollution, said operating system comprising:

a primary fuel circuit receiving fuel from a fuel tank and including an upstream primary conduit connected to the fuel tank, a pressure valve operatively disposed in said upstream primary conduit for controlling flow of the fuel to said fuel tank, and a downstream primary return conduit interconnecting said pressure valve and the fuel tank;

a secondary fuel circuit including an upstream secondary conduit connected to said primary upstream conduit, fuel injection means for selectively injecting the fuel into the combustion system of the engine connected to said to said upstream secondary conduit, a secondary return conduit interconnecting said fuel injection means and said primary return conduit, a valve disposed in said secondary return conduit and controlling flow through said second return conduit, fuel heating means for heating the fuel in said upstream secondary conduit to a temperature between 60° C. and 95° C., a temperature sensing means disposed in said secondary fuel circuit for sensing fuel temperature in said secondary fuel circuit; and a controller connected to said temperature sensing means and operatively connected to said valve in said secondary return conduit, said controller setting the temperature of the fuel in said upstream secondary conduit below a vaporization temperature of the fuel at a delivery fuel pressure, but above a vaporization temperature of the fuel at a pressure of said combustion system, and said controller further maintaining a target air-to-fuel ratio in a range of Lambda between 1.25 and 1.35.

4. The operating system as claimed in claim 3, wherein said controller is adapted for opening said valve and diverting fuel flow from said heating means when said fuel temperature sensed by said temperature sensing means exceeds a predetermined limit.

* * * * *